United States Patent
Sakurabu et al.

(10) Patent No.: US 11,095,845 B2
(45) Date of Patent: Aug. 17, 2021

(54) IMAGING CONTROL DEVICE, IMAGING APPARATUS, IMAGING CONTROL METHOD, AND IMAGING CONTROL PROGRAM

(71) Applicant: FUJIFILM Corporation, Tokyo (JP)

(72) Inventors: Hitoshi Sakurabu, Saitama (JP); Makoto Kobayashi, Saitama (JP); Ryo Hasegawa, Saitama (JP); Tomonori Masuda, Saitama (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 16/823,263

(22) Filed: Mar. 18, 2020

(65) Prior Publication Data
US 2020/0221050 A1 Jul. 9, 2020

Related U.S. Application Data

(63) Continuation of application No. PCT/JP2018/024545, filed on Jun. 28, 2018.

(30) Foreign Application Priority Data

Sep. 20, 2017 (JP) .............................. JP2017-180451

(51) Int. Cl.
*H04N 5/76* (2006.01)
*G06T 7/50* (2017.01)
(Continued)

(52) U.S. Cl.
CPC ................ *H04N 5/76* (2013.01); *G06T 7/20* (2013.01); *G06T 7/50* (2017.01); *H04N 5/2353* (2013.01); *H04N 5/351* (2013.01); *H04N 5/3532* (2013.01)

(58) Field of Classification Search
CPC ........ H04N 5/76; H04N 5/3532; H04N 5/351; H04N 5/2353; H04N 5/232933;
(Continued)

(56) References Cited

U.S. PATENT DOCUMENTS

2008/0284900 A1 11/2008 Abe
2011/0103644 A1* 5/2011 Garten ................... H04N 5/144
382/103
(Continued)

FOREIGN PATENT DOCUMENTS

JP H10126665 5/1998
JP 2008276214 11/2008
(Continued)

OTHER PUBLICATIONS

"International Search Report (Form PCT/ISA/210) of PCT/JP2018/024545," dated Aug. 21, 2018, with English translation thereof, pp. 1-5.
(Continued)

*Primary Examiner* — Michael Lee
(74) *Attorney, Agent, or Firm* — JCIPRNET

(57) ABSTRACT

A system control unit consecutively images a subject by driving based on a global shutter method, divides captured image data obtained by the imaging into a plurality of areas, and each time each area is generated, compares the generated area with the same area as the area in the captured image data generated by the imaging performed before the imaging, and detects a moving object from the area based on a result of the comparison. Based on a change in position of the detected moving object, the system control unit predicts a timing at which a trigger range TR set in the captured image overlaps with the moving object, and performs automatic imaging in a frame period that includes the timing.

20 Claims, 15 Drawing Sheets

(51) Int. Cl.
  *G06T 7/20* (2017.01)
  *H04N 5/235* (2006.01)
  *H04N 5/351* (2011.01)
  *H04N 5/353* (2011.01)

(58) Field of Classification Search
  CPC ............... H04N 5/23222; H04N 5/353; H04N 5/37452; H04N 5/772; G06T 7/50; G06T 7/20; G03B 7/091; G03B 15/00; G03B 17/38
  USPC .......................................................... 348/135
  See application file for complete search history.

(56) References Cited

U.S. PATENT DOCUMENTS

| | | | |
|---|---|---|---|
| 2011/0215323 A1 | 9/2011 | Kurokawa et al. | |
| 2013/0010171 A1* | 1/2013 | Miyata | H04N 5/2621 348/333.01 |
| 2014/0068514 A1* | 3/2014 | Ito | G06T 11/00 715/810 |
| 2014/0092019 A1* | 4/2014 | Chen | G06F 3/0317 345/163 |
| 2015/0326784 A1* | 11/2015 | Hayashi | H04N 5/23245 348/220.1 |
| 2016/0134368 A1 | 5/2016 | De Bruijn et al. | |
| 2017/0019589 A1 | 1/2017 | Moon et al. | |
| 2018/0189574 A1* | 7/2018 | Brueckner | G06K 9/00791 |
| 2020/0005468 A1* | 1/2020 | Paul | G06K 9/6274 |
| 2020/0304709 A1* | 9/2020 | Han | H04N 5/2353 |

FOREIGN PATENT DOCUMENTS

| | | |
|---|---|---|
| JP | 2011211699 | 10/2011 |
| JP | 2014011578 | 1/2014 |
| JP | 2014155173 | 8/2014 |
| JP | 2017059974 | 3/2017 |
| JP | 2017063430 | 3/2017 |

OTHER PUBLICATIONS

"Written Opinion of the International Searching Authority (Form PCT/ISA/237) of PCT/JP2018/024545," dated Aug. 21, 2018, with English translation thereof, pp. 1-14.

Office Action of Japan Counterpart Application, with English translation thereof, dated Jan. 19, 2021, pp. 1-8.

* cited by examiner

US 11,095,845 B2

IMAGING CONTROL DEVICE, IMAGING APPARATUS, IMAGING CONTROL METHOD, AND IMAGING CONTROL PROGRAM

CROSS REFERENCE TO RELATED APPLICATIONS

This application is a Continuation of PCT International Application No. PCT/JP2018/024545 filed on Jun. 28, 2018, which claims priority under 35 U.S.C § 119(a) to Patent Application No. 2017-180451 filed in Japan on Sep. 20, 2017, all of which are hereby expressly incorporated by reference into the present application.

BACKGROUND OF THE INVENTION

1. Field of the Invention

The present invention relates to an imaging control device, an imaging apparatus, an imaging control method, and an imaging control program.

2. Description of the Related Art

In recent years, there has been an increased demand for an electronic apparatus having an imaging function such as a digital still camera, a digital video camera, or a camera-equipped mobile phone (for example, a smartphone) along with an increase in resolution of an imaging sensor such as a charge coupled device (CCD) image sensor or a complementary metal oxide semiconductor (CMOS) image sensor. The electronic apparatus having the imaging function is referred to as an imaging apparatus.

By using the imaging apparatus, a subject may be imaged at an instantaneous timing such as a moment in which a bird flies off or a moment in which a water drop falls onto a water surface. However, it is difficult for a user of the imaging apparatus to accurately determine such a timing and manually provide an imaging instruction at the timing.

Therefore, JP2014-011578A, JP2017-059974A, and JP2014-155173A suggest an imaging apparatus capable of imaging a subject at an accurate timing by setting a region for determining an imaging start timing on a captured image and automatically starting imaging for recording in a case where the subject enters the region or a case where the subject is predicted to enter the region.

SUMMARY OF THE INVENTION

A MOS type imaging sensor is present as an imaging sensor mounted in the imaging apparatus. Driving based on a global shutter method and driving based on a rolling shutter method are present as a method of driving the MOS type.

The driving based on the global shutter method is a method of starting exposure at the same time in all pixels by resetting photoelectric converters of all pixels of the imaging sensor at the same time, then ending the exposure at the same time in all pixels by transferring charges accumulated in the photoelectric converter of each pixel to a charge holder of each pixel at the same time, and then, sequentially converting the charges accumulated in the charge holder into a pixel signal and reading out the pixel signal into a signal line for each pixel row.

The driving based on the rolling shutter method is a method of sequentially performing driving of starting exposure of a pixel row by resetting each photoelectric converter of the pixel row of the imaging sensor and then, reading out a pixel signal corresponding to charges accumulated in each photoelectric converter of the pixel row into a signal line while changing the pixel row.

The following problem arises in a case where the driving based on the rolling shutter method is combined with the automatic imaging technology disclosed in JP2014-011578A, JP2017-059974A, and JP2014-155173A.

For example, it is considered that the exposure of the pixel row is sequentially started from an upper side to a lower side on an imaging surface of the imaging sensor, and the subject that is moving at a high speed from the upper side to the lower side on the imaging surface of the imaging sensor is imaged. In this case, depending on a movement speed of the subject, the subject may not be detected, and imaging at an accurate timing cannot be performed.

Meanwhile, in a case where the driving based on the global shutter method is combined with the automatic imaging technology disclosed in JP2014-011578A, JP2017-059974A, and JP2014-155173A, the exposure of all pixel rows is started at the same time on the imaging surface. Thus, the problem of not detecting the subject depending on a movement direction of the subject does not arise.

However, in the driving based on the global shutter method, the pixel signal is sequentially read for each pixel row. Thus, in a case where the subject is detected after the pixel signals are output from all pixel rows and the pixel signals become usable, it takes time to detect the subject, and a chance to press a shutter may be missed.

The present invention is conceived in view of the above matter. An object of the present invention is to provide an imaging control device, an imaging apparatus, an imaging control method, and an imaging control program capable of starting imaging for recording in a state where a subject is at a desired position in a case where the subject is imaged by driving an imaging sensor based on a global shutter method.

An imaging control device of the present invention comprises a drive control unit that controls a driver of an imaging sensor which includes a plurality of pixels each including a photoelectric converter and a charge holder which holds charges transferred from the photoelectric converter and from which a signal corresponding to the charges is read out by a reading circuit, and an imaging surface on which a plurality of pixel rows each including a plurality of the pixels arranged in a first direction are arranged in a second direction orthogonal to the first direction to consecutively perform driving of starting exposure of the plurality of pixels by resetting the photoelectric converter of each of the plurality of pixels at the same time, ending the exposure by transferring the charges accumulated in the photoelectric converter of each of the plurality of pixels by the exposure to the charge holder at the same time, and then, sequentially selecting the pixel row from one end side to another end side of the imaging surface in the second direction, and reading out a pixel signal corresponding to the charges held in the charge holder of the selected pixel row, a moving object detection unit that performs a process of dividing captured image data generated based on the pixel signal read out by the driving into a plurality of areas in the second direction and detecting a moving object from the area based on a result of comparing the generated area with the same area as the area in the captured image data generated based on the pixel signal read out by the driving performed before the driving, and a recording control unit that predicts a timing at which a range set in the captured image data overlaps with the moving object based on a change in position of the moving object detected by the moving object detection unit and processes the pixel signal read out by the driving executed in a period including the timing as a signal for recording on a recording medium.

An imaging apparatus of the present invention comprises the imaging control device, the imaging sensor, and the driver.

An imaging control method of the present invention comprises a drive control step of controlling a driver of an imaging sensor which includes a plurality of pixels each including a photoelectric converter and a charge holder which holds charges transferred from the photoelectric converter and from which a signal corresponding to the charges is read out by a reading circuit, and an imaging surface on which a plurality of pixel rows each including a plurality of the pixels arranged in a first direction are arranged in a second direction orthogonal to the first direction to consecutively perform driving of starting exposure of the plurality of pixels by resetting the photoelectric converter of each of the plurality of pixels at the same time, ending the exposure by transferring the charges accumulated in the photoelectric converter of each of the plurality of pixels by the exposure to the charge holder at the same time, and then, sequentially selecting the pixel row from one end side to another end side of the imaging surface in the second direction, and reading out a pixel signal corresponding to the charges held in the charge holder of the selected pixel row, a moving object detection step of performing a process of dividing captured image data generated based on the pixel signal read out by the driving into a plurality of areas in the second direction and detecting a moving object from the area based on a result of comparing the generated area with the same area as the area in the captured image data generated based on the pixel signal read out by the driving performed before the driving, and a recording control step of predicting a timing at which a range set in the captured image data overlaps with the moving object based on a change in position of the moving object detected in the moving object detection step and processing the pixel signal read out by the driving executed in a period including the timing as a signal for recording on a recording medium.

An imaging control program of the present invention causes a computer to execute a drive control step of controlling a driver of an imaging sensor which includes a plurality of pixels each including a photoelectric converter and a charge holder which holds charges transferred from the photoelectric converter and from which a signal corresponding to the charges is read out by a reading circuit, and an imaging surface on which a plurality of pixel rows each including a plurality of the pixels arranged in a first direction are arranged in a second direction orthogonal to the first direction to consecutively perform driving of starting exposure of the plurality of pixels by resetting the photoelectric converter of each of the plurality of pixels at the same time, ending the exposure by transferring the charges accumulated in the photoelectric converter of each of the plurality of pixels by the exposure to the charge holder at the same time, and then, sequentially selecting the pixel row from one end side to another end side of the imaging surface in the second direction, and reading out a pixel signal corresponding to the charges held in the charge holder of the selected pixel row, a moving object detection step of performing a process of dividing captured image data generated based on the pixel signal read out by the driving into a plurality of areas in the second direction and detecting a moving object from the area based on a result of comparing the generated area with the same area as the area in the captured image data generated based on the pixel signal read out by the driving performed before the driving, and a recording control step of predicting a timing at which a range set in the captured image data overlaps with the moving object based on a change in position of the moving object detected in the moving object detection step and processing the pixel signal read out by the driving executed in a period including the timing as a signal for recording on a recording medium.

According to the present invention, an imaging control device, an imaging apparatus, an imaging control method, and an imaging control program capable of starting imaging for recording in a state where a subject is at a desired position in a case where the subject is imaged by driving an imaging sensor based on a global shutter method can be provided.

DESCRIPTION OF THE PREFERRED EMBODIMENTS

Hereinafter, an embodiment of the present invention will be described with reference to the drawings.

Figure 1:
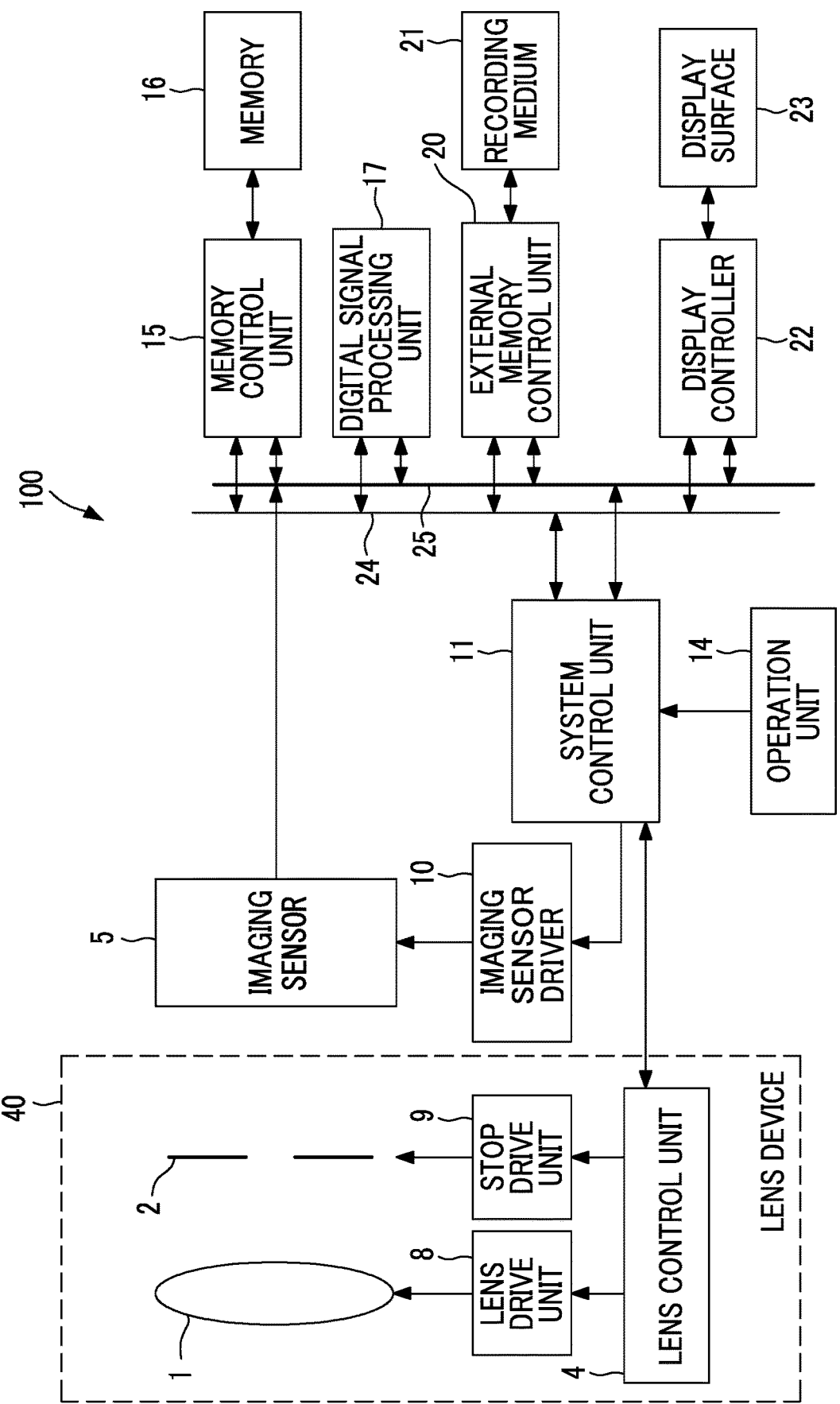
FIG. 1 is a diagram illustrating a schematic configuration of a digital camera 100 that is an imaging apparatus according to one embodiment of the present invention.

FIG. 1 is a diagram illustrating a schematic configuration of a digital camera 100 that is an imaging apparatus according to one embodiment of the present invention.

The digital camera 100 illustrated in FIG. 1 comprises a lens device 40 that includes an imaging lens 1, a stop 2, a lens control unit 4, a lens drive unit 8, and a stop drive unit 9.

The lens device 40 may be attachable and detachable with respect to a main body of the digital camera 100 or may be integrated with the main body of the digital camera 100.

The imaging lens 1 and the stop 2 constitute an imaging optical system. The imaging lens 1 includes a focus lens, a zoom lens, or the like that can be moved in an optical axis direction.

The focus lens is a lens for adjusting a focal position of the imaging optical system and is configured with a single lens or a plurality of lenses. By moving the focus lens in the optical axis direction, a position of a principal point of the focus lens is changed in the optical axis direction, and the focal position on a subject side is changed.

A liquid lens of which the position of the principal point in the optical axis direction can be changed by electric control may be used as the focus lens.

The zoom lens is a lens for adjusting a focal length of the imaging optical system and is configured with a single lens or a plurality of lenses. By moving the zoom lens in the optical axis direction, the focal length of the imaging optical system is changed.

The lens control unit 4 of the lens device 40 is configured to be capable of communicating with a system control unit 11 of the digital camera 100 in a wired or wireless manner.

In accordance with an instruction from the system control unit 11, the lens control unit 4 changes the position of a principal point of the focus lens by controlling the focus lens included in the imaging lens 1 through the lens drive unit 8, changes the position (focal length) of the zoom lens by controlling the zoom lens included in the imaging lens 1 through the lens drive unit 8, or controls an opening amount of the stop 2 through the stop drive unit 9.

The digital camera 100 further comprises a MOS type imaging sensor 5 that images a subject through an imaging optical system.

The imaging sensor 5 includes an imaging surface on which a plurality of pixels are two-dimensionally arranged, converts a subject image formed on the imaging surface by the imaging optical system into pixel signals by the plurality of pixels, and outputs the pixel signals. Hereinafter, a set of pixel signals output from the pixels of the imaging sensor 5 will be referred to as a captured image signal.

The system control unit 11 that manages and controls the entire electric control system of the digital camera 100 drives the imaging sensor 5 through the imaging sensor drive unit 10 and outputs the subject image captured through the imaging optical system of the lens device 40 as the captured image signal.

The imaging sensor drive unit 10 drives the imaging sensor 5 by generating a drive signal based on an instruction from the system control unit 11 and supplying the drive signal to the imaging sensor 5. A hardware configuration of the imaging sensor drive unit 10 is an electric circuit configured by combining circuit elements such as semiconductor elements. The imaging sensor drive unit 10 constitutes a driver of the imaging sensor 5.

A command signal from a user is input into the system control unit 11 through an operation unit 14. The operation unit 14 includes a touch panel integrated with a display surface 23, described later, various buttons, and the like.

The system control unit 11 manages and controls the entire digital camera 100. A hardware structure of the system control unit 11 corresponds to various processors that perform processes by executing programs including an imaging control program.

The various processors include a central processing unit (CPU) that is a general-purpose processor performing various processes by executing a program, a programmable logic device (PLD) that is a processor of which a circuit configuration can be changed after manufacturing like a field programmable gate array (FPGA), or a dedicated electric circuit that is a processor having a circuit configuration dedicatedly designed to execute a specific process like an application specific integrated circuit (ASIC).

More specifically, a structure of the various processors is an electric circuit in which circuit elements such as semiconductor elements are combined.

The system control unit 11 may be configured with one of the various processors or may be configured with a combination of two or more processors of the same type or different types (for example, a combination of a plurality of FPGAs or a combination of a CPU and an FPGA).

Furthermore, the electric control system of the digital camera 100 comprises a memory 16 including a random access memory (RAM) and a read only memory (ROM), a memory control unit 15 that controls data recording in the memory 16 and data read from the memory 16, a digital signal processing unit 17 that performs digital signal processing on the captured image signal output from the imaging sensor 5, an external memory control unit 20 that controls data recording in a recording medium 21 and data read from the recording medium 21, the display surface 23 configured with an organic electroluminescence (EL) panel, a liquid crystal panel, or the like, and a display controller 22 that controls display on the display surface 23.

Programs executed by the system control unit 11 including the imaging control program are recorded in the ROM included in the memory 16.

The recording medium 21 is a semiconductor memory such as a flash memory incorporated in the digital camera 100, a portable semiconductor memory that is attachable and detachable with respect to the digital camera 100, or the like.

The memory control unit 15, the digital signal processing unit 17, the external memory control unit 20, and the display controller 22 are connected to each other through a control bus 24 and a data bus 25 and are controlled by instructions from the system control unit 11.

A hardware structure of the digital signal processing unit 17 includes the above illustrated various processors that perform processes by executing programs, a line memory for performing digital signal processing on the captured image signal, and the like.

The display controller 22 includes the above illustrated various processors that perform processes by executing programs, and a display memory for storing data of an image to be displayed.

Figure 2:
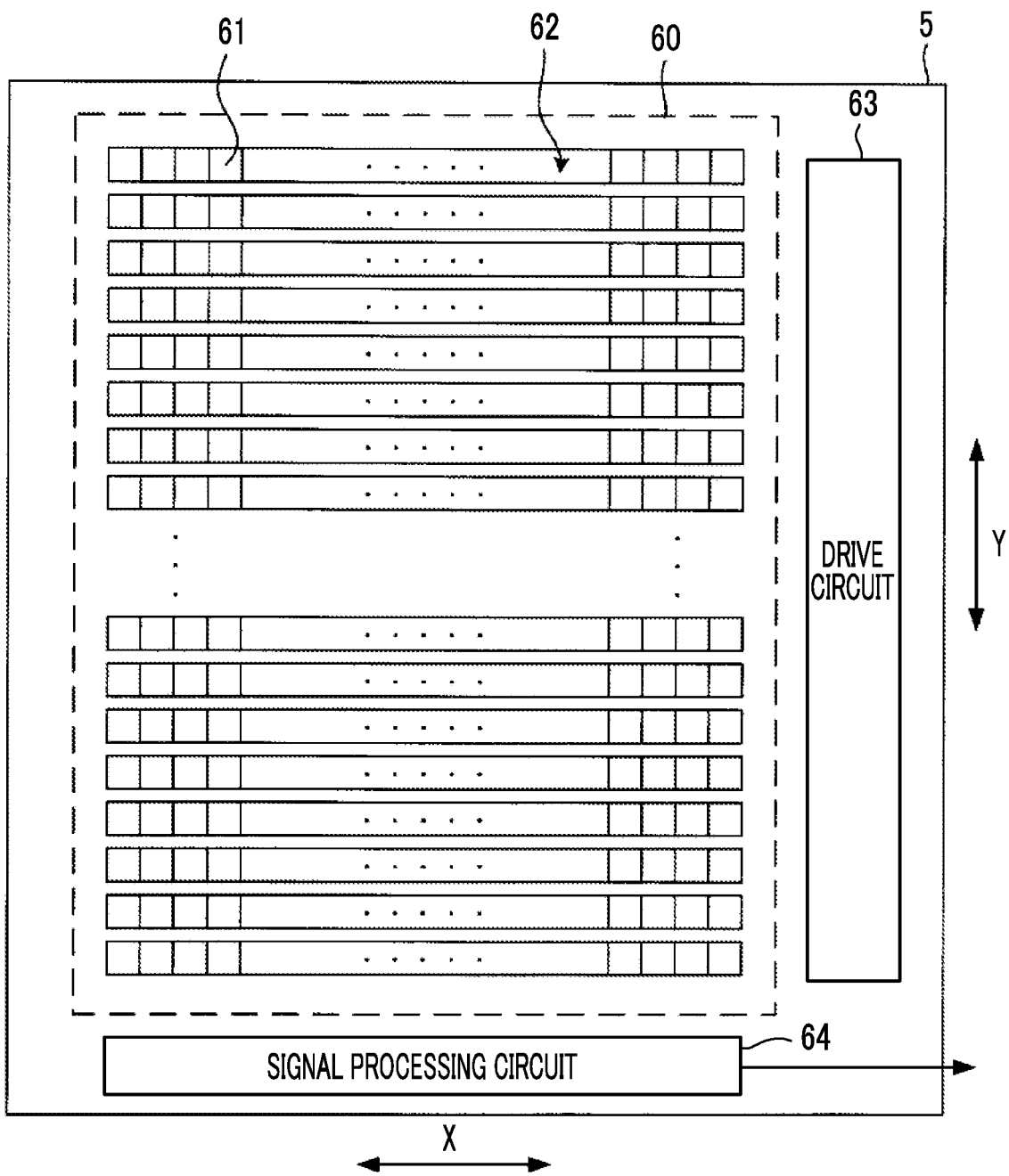
FIG. 2 is a schematic plan view illustrating a schematic configuration of an imaging sensor 5 illustrated in FIG. 1.

FIG. 2 is a schematic plan view illustrating a schematic configuration of the imaging sensor 5 illustrated in FIG. 1.

The imaging sensor 5 comprises an imaging surface 60 on which a plurality of pixel rows 62 each including a plurality of pixels 61 arranged in a row direction X that is a first direction are arranged in a column direction Y that is a second direction and is orthogonal to the row direction X, a drive circuit 63 that drives the pixels 61 arranged on the imaging surface 60, and a signal processing circuit 64 that processes a pixel signal read into a signal line from each pixel 61 of the pixel rows 62 arranged on the imaging surface 60.

Hereinafter, in FIG. 2, an end portion of the imaging surface 60 on one end side (an upper side in FIG. 2) of the column direction Y will be referred to as an upper end, and an end portion of the imaging surface 60 on the other end side (a lower side in FIG. 2) of the column direction Y will be referred to as a lower end.

Figure 3:
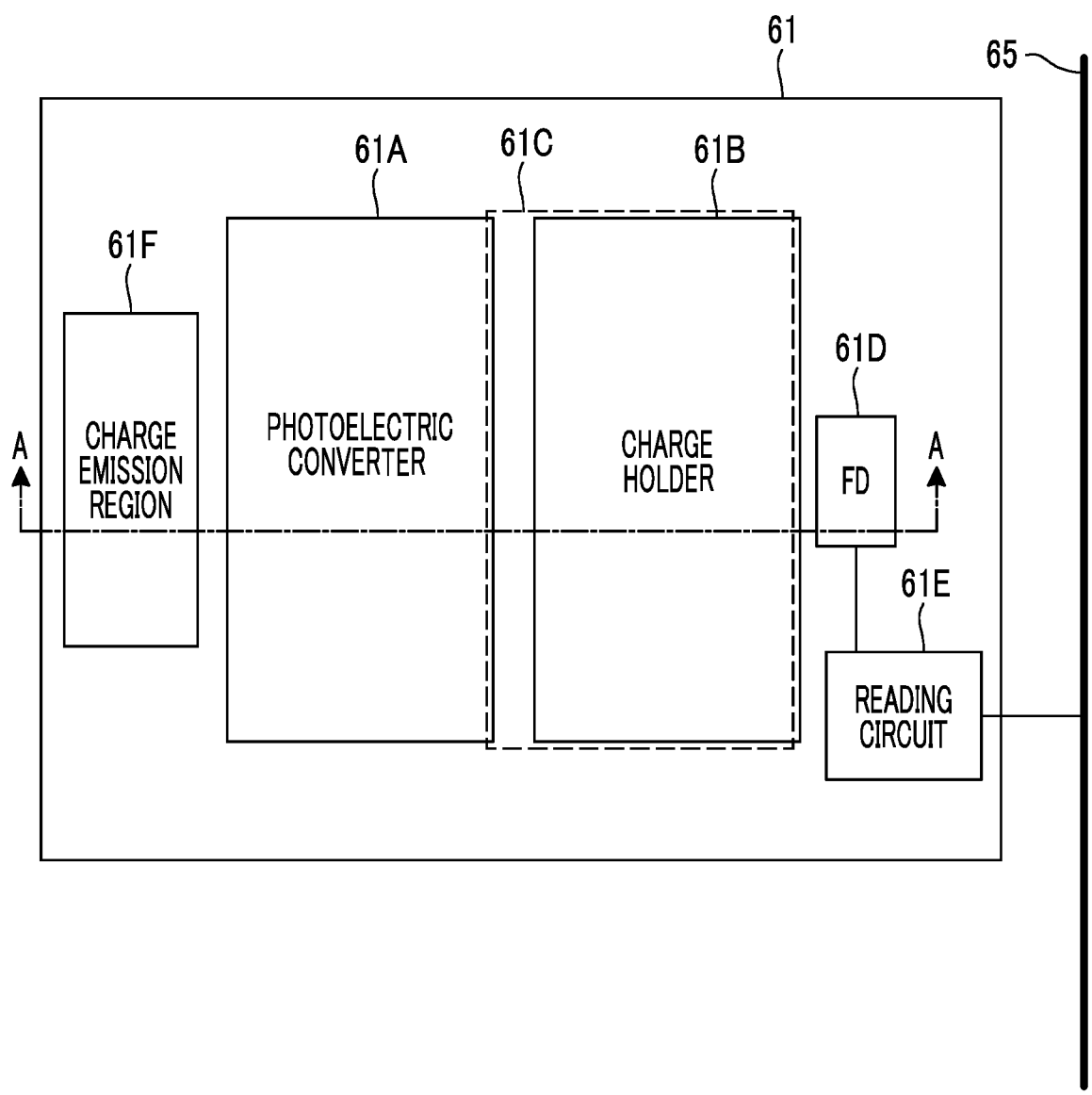
FIG. 3 is a schematic plan view illustrating a schematic configuration of a pixel 61 of the imaging sensor 5 illustrated in FIG. 2.

FIG. 3 is a schematic plan view illustrating a schematic configuration of the pixel 61 of the imaging sensor 5 illustrated in FIG. 2.

As illustrated in FIG. 3, the pixel 61 comprises a photoelectric converter 61A, a charge holder 61B, a charge transfer unit 61C, a floating diffusion 61D, a reading circuit 61E, and a charge emission region 61F.

The photoelectric converter 61A receives light passing through the imaging optical system of the lens device 40 and generates and accumulates charges corresponding to a light reception intensity. For example, the photoelectric converter 61A is configured with a silicon photodiode formed in the semiconductor substrate.

The charge transfer unit 61C transfers the charges accumulated in the photoelectric converter 61A to the charge holder 61B. The charge transfer unit 61C is configured with an impurity region in the semiconductor substrate and an electrode formed above the impurity region.

The charges are transferred to the charge holder 61B from the photoelectric converter 61A by controlling a voltage applied to the electrode constituting the charge transfer unit 61C by the drive circuit 63 (refer to FIG. 2).

The charge holder 61B holds the charges transferred from the photoelectric converter 61A by the charge transfer unit 61C. The charge holder 61B is configured with an impurity region in the semiconductor substrate.

The floating diffusion 61D converts charges into a voltage signal. The charges held in the charge holder 61B are transferred to the floating diffusion 61D.

The reading circuit 61E is a circuit that reads out the voltage signal corresponding to a potential of the floating diffusion 61D into a signal line 65 as a pixel signal. The reading circuit 61E is driven by the drive circuit 63 illustrated in FIG. 2.

The charge emission region 61F is disposed for emitting the charges accumulated in the photoelectric converter 61A from the photoelectric converter 61A.

Figure 4:
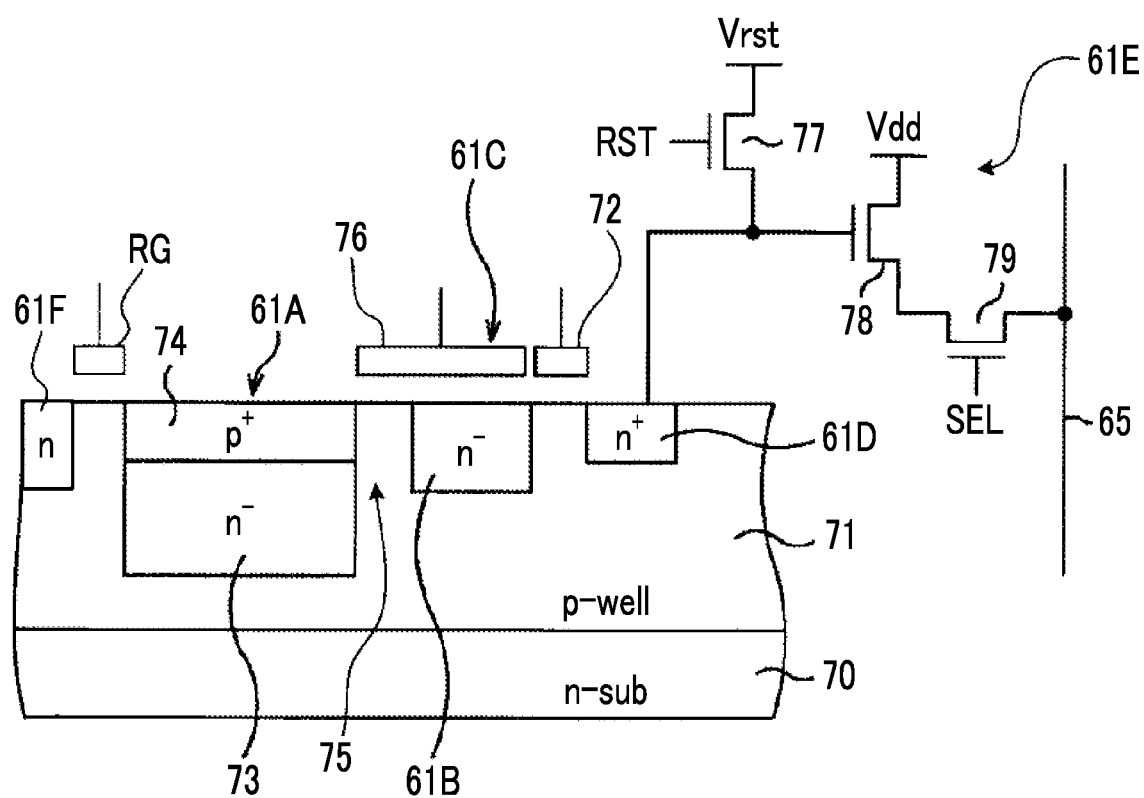
FIG. 4 is a schematic A-A cross sectional view of the pixel 61 illustrated in FIG. 3.

FIG. 4 is a schematic A-A cross sectional view of the pixel 61 illustrated in FIG. 3.

As illustrated in FIG. 4, a P-well layer 71 is formed on a surface of an N-type substrate 70, and the photoelectric converter 61A is formed on a surface portion of the P-well layer 71.

The photoelectric converter 61A is configured with an N-type impurity layer 73 and a P-type impurity layer 74 formed on the N-type impurity layer 73. The N-type substrate 70 and the P-well layer 71 constitute the semiconductor substrate.

On the surface portion of the P-well layer 71, the charge holder 61B that includes an N-type impurity layer is formed to be spaced from the photoelectric converter 61A.

A transfer electrode 76 is formed above a region 75 of the P-well layer 71 between the charge holder 61B and the photoelectric converter 61A through an oxidation film, not illustrated.

The region 75 and the transfer electrode 76 constitute the charge transfer unit 61C in FIG. 3. In the example in FIG. 4, the transfer electrode 76 is formed up to above the charge holder 61B. However, the transfer electrode 76 may be formed above at least the region 75.

By forming a channel in the region 75 by controlling a potential of the transfer electrode 76, the charges accumulated in the photoelectric converter 61A can be transferred to the charge holder 61B. The potential of the transfer electrode 76 is controlled by the drive circuit 63 in FIG. 2.

On the surface portion of the P-well layer 71, the charge emission region 61F that includes an N-type impurity layer is formed to be spaced slightly to the left from the photoelectric converter 61A.

A reset electrode RG is formed above the P-well layer 71 between the charge emission region 61F and the photoelectric converter 61A through an oxidation film, not illustrated.

By forming a channel below the reset electrode RG by controlling a potential of the reset electrode RG, the photoelectric converter 61A can be reset by emitting the charges accumulated in the photoelectric converter 61A to the charge emission region 61F. The potential of the reset electrode RG is controlled by the drive circuit 63 in FIG. 2.

On the surface portion of the P-well layer 71, the floating diffusion 61D that includes an N-type impurity layer is formed to be spaced from the charge holder 61B.

A reading electrode 72 is formed above the P-well layer 71 between the charge holder 61B and the floating diffusion 61D through an oxidation film, not illustrated.

By forming a channel in a region between the charge holder 61B and the floating diffusion 61D by controlling a potential of the reading electrode 72, the charges held in the charge holder 61B can be transferred to the floating diffusion 61D. The potential of the reading electrode 72 is controlled by the drive circuit 63 in FIG. 2.

In the example illustrated in FIG. 4, the reading circuit 61E is configured with a reset transistor 77 that resets the potential of the floating diffusion 61D, an output transistor 78 that converts the potential of the floating diffusion 61D into a pixel signal and outputs the pixel signal, and a selection transistor 79 for selectively reading out the pixel signal output from the output transistor 78 into the signal line 65. The configuration of the reading circuit is one example and is not for limitation purposes.

The reading circuit 61E may be shared by the plurality of pixels 61.

While the photoelectric converter 61A is configured with a silicon photodiode, the photoelectric converter 61A may also be configured with a film of an organic or inorganic photoelectric conversion material formed above the semiconductor substrate and an impurity region formed in the semiconductor substrate for accumulating charges generated in the film. In this case, the charges accumulated in the impurity region are transferred to the charge holder 61B in FIG. 4.

For example, all pixels 61 arranged on the imaging surface 60 illustrated in FIG. 2 include a pixel that detects red light, a pixel that detects green light, and a pixel that detects blue light. For example, these three types of pixels are arranged in a Bayer form on the imaging surface 60.

The drive circuit 63 illustrated in FIG. 2 performs reading of the pixel signal corresponding to the charges accumulated in each photoelectric converter 61A included in the pixel row 62 into the signal line 65, and the like by driving the transfer electrode 76, the reading electrode 72, and the reading circuit 61E of each pixel 61 independently for each pixel row 62.

In addition, the drive circuit 63 transfers the charges to the charge holder 61B from the photoelectric converter 61A of each pixel 61 at the same time by driving the charge transfer units 61C of all pixels 61 at the same time. The drive circuit 63 is controlled by the imaging sensor driver 10.

The signal processing circuit 64 illustrated in FIG. 2 performs correlative double sampling processing on the pixel signal read into the signal line 65 from each pixel 61 of the pixel row 62, converts the pixel signal after the correlative double sampling processing into a digital signal, and outputs the digital signal to the data bus 25. The signal processing circuit 64 is controlled by the imaging sensor driver 10.

The digital signal processing unit 17 generates the captured image data by performing digital signal processing such as a demosaicing process and gamma-correction processing on the captured image signal output to the data bus 25 from the imaging sensor 5.

The captured image data is data in which pixel data that includes pixel signals of three color components is present at a coordinate position corresponding to each pixel 61 as a generation source from which the pixel signal is read out. The captured image data is data in a format in which a moving object detection process described later can be performed.

The demosaicing process refers to a process of interpolating the pixel signal of a color component not obtained from the pixel 61 corresponding to the coordinate position of each pixel data constituting the captured image data, using the pixel signal of the color component read out from another pixel 61 near the pixel 61.

The digital signal processing unit 17 generates live view image data to be displayed on the display surface 23 from the captured image data, and causes the display controller 22 to render a live view image based on the live view image data on the display surface 23.

The digital signal processing unit 17 does not perform signal processing for generating the captured image data after the acquisition of the pixel signals from all pixels 61 on the imaging surface 60 is ended, and performs the signal processing each time the pixel signal is output from each pixel 61 of the pixel row 62 and the pixel signals of a line necessary for the signal processing are collected. That is, the captured image data is sequentially generated each time the pixel signal is read out from the pixel row 62.

Each pixel data constituting the captured image data generated by the digital signal processing unit 17 corresponds to any pixel 61 on the imaging surface 60. Thus, a direction in which the pixel data corresponding to each pixel 61 of one pixel row 62 is arranged in the captured image data is regarded as the row direction X in FIG. 2, and a direction orthogonal to the row direction X in the captured image data is regarded as the column direction Y in FIG. 2.

Figure 5:
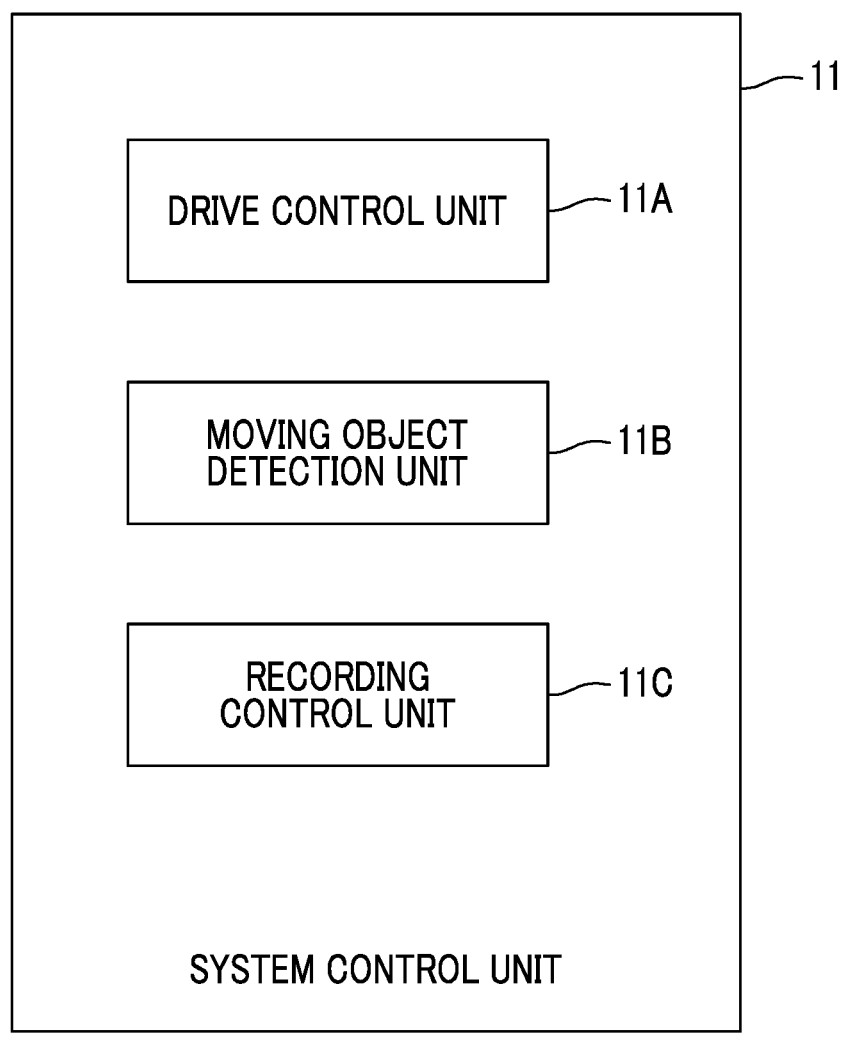
FIG. 5 is a function block diagram of a system control unit 11 in the digital camera 100 illustrated in FIG. 1.

FIG. 5 is a function block diagram of the system control unit 11 in the digital camera 100 illustrated in FIG. 1.

The digital camera 100 illustrated in FIG. 1 is equipped with an automatic shutter mode as an imaging mode. In the automatic shutter mode, in a case where the user designates a predetermined range (hereinafter, referred to as a trigger range) in the captured image data obtained by imaging the subject by the imaging sensor 5, a timing at which the trigger range overlaps with a moving object that is an object moving in the subject being imaged is determined.

The pixel signal obtained by imaging by the imaging sensor 5 at the timing is processed as a signal for recording on the recording medium 21. Function blocks illustrated in FIG. 5 show function blocks of the system control unit 11 in a case where the automatic shutter mode is set.

As illustrated in FIG. 5, by executing the programs recorded in the ROM of the memory 16 including the imaging control program, the system control unit 11 functions as an imaging control device that comprises a drive control unit 11A, a moving object detection unit 11B, and a recording control unit 11C.

The drive control unit 11A controls the imaging sensor driver 10 to cause the imaging sensor driver 10 to consecutively perform driving (hereinafter, referred to as imaging driving) that includes a set of global reset driving, global shutter driving, and rolling reading driving.

The global reset driving is driving in which the exposure of the plurality of pixels 61 is started at the same time by resetting the photoelectric converter 61A of each of the plurality of pixels 61 (all pixels 61 or a part of all pixels 61) on the imaging surface 60 at the same time.

The global shutter driving is driving in which the exposure is ended in each pixel 61 at the same time by transferring the charges that are accumulated in the photoelectric converter 61A of each pixel 61 by the exposure started in each pixel 61 by the global reset driving to the charge holder 61B of each pixel 61.

The rolling read-out driving is driving in which the pixel row 62 including the pixel 61 in which charges are held in the charge holder 61B by the global shutter driving is sequentially selected from the upper end side to the lower end side of the imaging surface 60, and the pixel signal corresponding to the charges held in the charge holder 61B of the selected pixel row 62 is read out into the signal line 65.

Hereinafter, an interval between start timings of the global reset driving in the consecutively performed imaging driving will be defined as a frame period.

The moving object detection unit 11B detects the moving object that is an object moving, from the captured image data generated based on the pixel signal read out from the imaging sensor 5 by the consecutively performed imaging driving.

Specifically, the moving object detection unit 11B divides the captured image data generated by the digital signal processing unit 17 into a plurality of areas in the column direction Y.

Each time one area is generated by the digital signal processing unit 17, the moving object detection unit 11B compares the generated area with an area that is the same as the area in the captured image data generated based on the pixel signal read out by the imaging driving performed before the imaging driving for obtaining the pixel signal from a generation source of the area, and performs a process of detecting the moving object from the generated area based on a comparison result.

Figure 6:
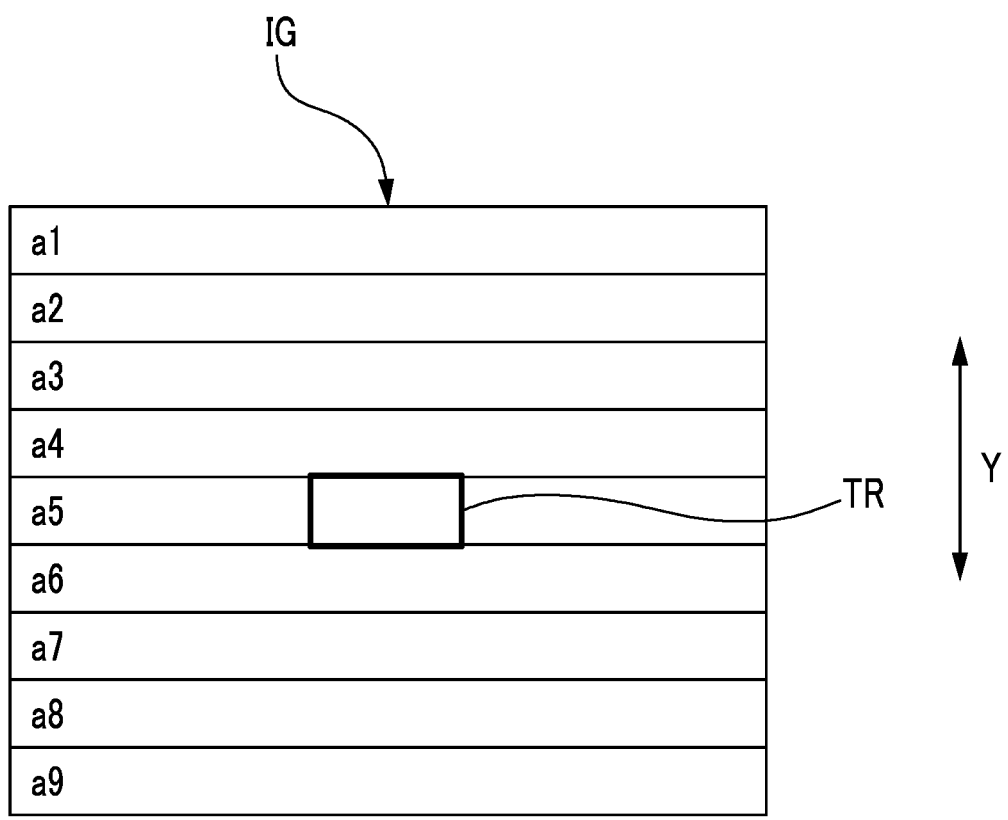
FIG. 6 is a diagram illustrating an example of dividing captured image data generated by a digital signal processing unit 17.

FIG. 6 is a diagram illustrating an example of dividing the captured image data generated by the digital signal processing unit 17.

In the example illustrated in FIG. 6, captured image data IG is equally divided into nine areas of an area a1 to an area a9 in the column direction Y.

In FIG. 6, an example in which a trigger range TR is set in a center part of the captured image data IG in the column direction Y is illustrated.

The user sets the trigger range TR by operating a touch panel and designating any range on the live view image in a state where the automatic shutter mode is set and the live view image is displayed on the display surface 23.

Each display pixel constituting the display surface 23 corresponds to any pixel data of the captured image data. Thus, in a case where a display pixel in the predetermined range is selected by the touch panel, a range surrounded by the pixel data corresponding to the selected display pixel is set as the trigger range TR.

In the example illustrated in FIG. 6, the captured image data IG generated by each imaging driving performed under control of the drive control unit 11A is divided into the area a5 that is a first area and includes the trigger range TR, the area a1, the area a2, the area a3, and the area a4 that are second areas generated based on the pixel signal read out from the pixel row 62 on the upper end side of the imaging surface 60 from the pixel row 62 from which the pixel signal of the generation source of the area a5 is read out, and the area a6, the area a7, the area a8, and the area a9 that are third areas generated based on the pixel signal read out from the pixel row 62 on the lower end side of the imaging surface 60 from the pixel row 62 from which the pixel signal of the generation source of the area a5 is read out.

In a case where the area a1 of the captured image data IG is generated by performing the most recent imaging driving, the moving object detection unit 11B compares the area a1 with the area a1 of the captured image data IG obtained by the imaging driving (for example, the imaging driving immediately before the most recent imaging driving) before the most recent imaging driving, and determines whether or not the moving object is included in the area a1 and a position of the moving object in the area a1 in a case where the moving object is included.

The moving object detection unit 11B performs the same moving object detection process on the area a2 to the area a9 of the captured image data IG and determines the presence or absence of the moving object and the position of the moving object each time each area is generated.

Returning to FIG. 5, the recording control unit 11C predicts the timing at which the trigger range TR set in the captured image data IG overlaps with the moving object, based on a change in position of the moving object detected by the moving object detection unit 11B.

As the signal for recording on the recording medium 21, the recording control unit 11C processes the pixel signal that is read out by the imaging driving executed in the frame period including the timing. Hereinafter, this process will be referred to as automatic imaging.

The processing of the pixel signal read out by the imaging driving as the signal for recording on the recording medium 21 means that the pixel signal is recorded on the recording medium 21 as the captured image data in RAW format or the captured image data generated based on the pixel signal is converted into captured image data in a predetermined file format such as JPEG and then, is recorded on the recording medium 21.

Unlike temporary recording of data in a work memory, data recorded on the recording medium 21 is held unless a deletion instruction is provided from the user.

Figure 7:
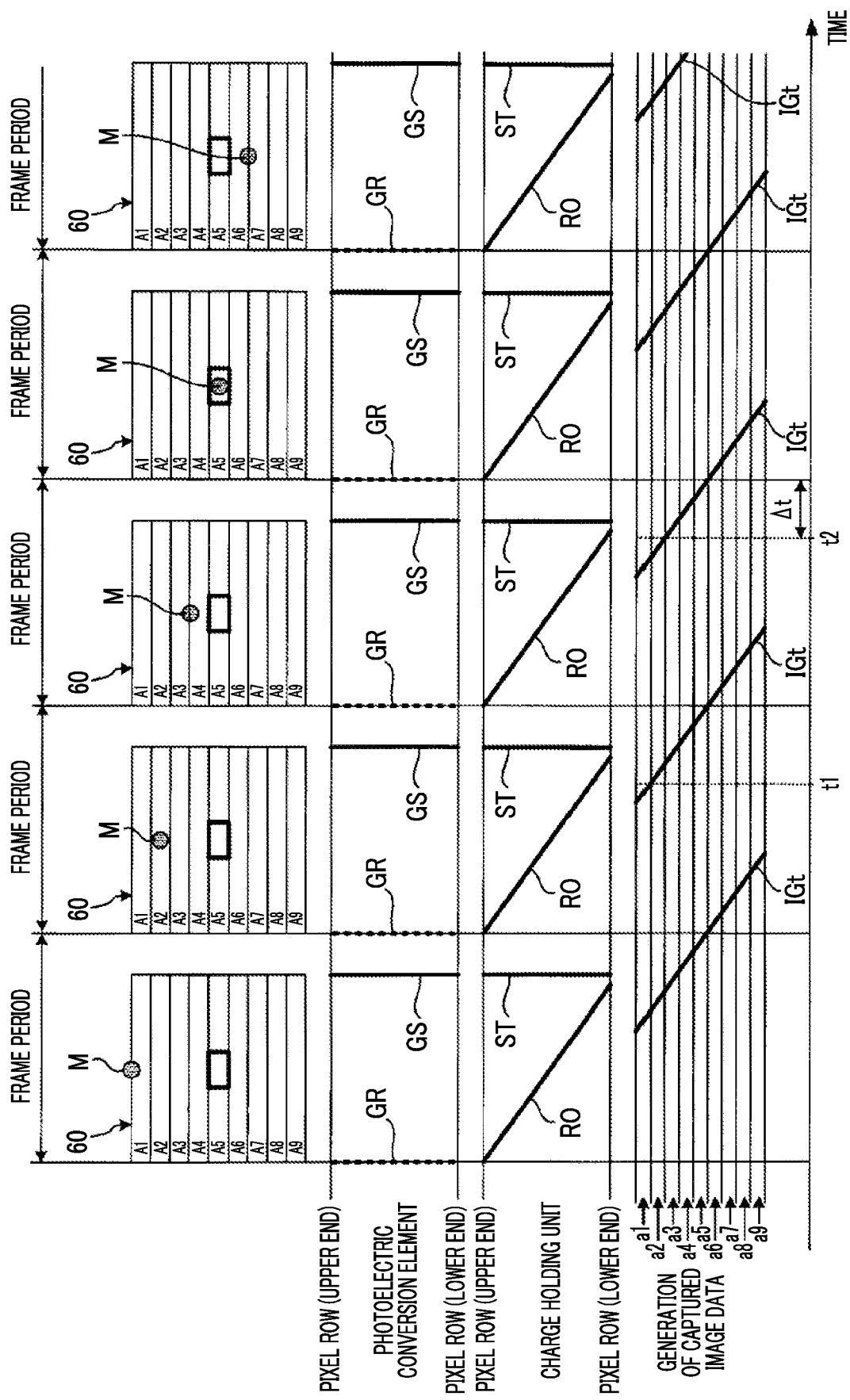
FIG. 7 is a timing chart illustrating an operation at a time of an automatic shutter mode of the digital camera 100 illustrated in FIG. 1.

FIG. 7 is a timing chart illustrating an operation at the time of the automatic shutter mode of the digital camera 100 illustrated in FIG. 1.

FIG. 7 illustrates an operation example in a case where a moving object M that is moving from the upper end side toward the lower end side of the imaging surface 60 is included in the subject (the subject image formed on the imaging surface 60) being imaged by the digital camera 100.

In FIG. 7, a horizontal axis denotes time. In the uppermost part of FIG. 7, a position of the moving object M formed on the imaging surface 60 in each frame period is schematically illustrated.

The imaging surface 60 illustrated in the uppermost part of FIG. 7 is divided into a light reception area A1 to a light reception area A9 for description. In addition, on the imaging surface 60, a range corresponding to the trigger range set in the captured image data IG is illustrated by a thick frame.

The light reception area A1 is a region in which the pixel 61 from which the pixel signal of the generation source of the area a1 of the captured image data IG is read out is arranged.

The light reception area A2 is a region in which the pixel 61 from which the pixel signal of the generation source of the area a2 of the captured image data IG is read out is arranged.

The light reception area A3 is a region in which the pixel 61 from which the pixel signal of the generation source of the area a3 of the captured image data IG is read out is arranged.

The light reception area A4 is a region in which the pixel 61 from which the pixel signal of the generation source of the area a4 of the captured image data IG is read out is arranged.

The light reception area A5 is a region in which the pixel 61 from which the pixel signal of the generation source of the area a5 of the captured image data IG is read out is arranged.

The light reception area A6 is a region in which the pixel 61 from which the pixel signal of the generation source of the area a6 of the captured image data IG is read out is arranged.

The light reception area A7 is a region in which the pixel 61 from which the pixel signal of the generation source of the area a7 of the captured image data IG is read out is arranged.

The light reception area A8 is a region in which the pixel 61 from which the pixel signal of the generation source of the area a8 of the captured image data IG is read out is arranged.

The light reception area A9 is a region in which the pixel 61 from which the pixel signal of the generation source of the area a9 of the captured image data IG is read out is arranged.

As illustrated in FIG. 7, the moving object M included in the subject being imaged by the digital camera 100 is formed in the light reception area A1 in the initial frame period and is formed in the light reception area A2 in the second frame period.

In addition, the moving object M is formed in the light reception area A3 and the light reception area A4 in the third frame period, is formed in the light reception area A5 in the fourth frame period, and is formed in the light reception area A6 and the light reception area A7 in the fifth frame period.

Accordingly, the moving object M is moving from the upper end side to the lower end side on the imaging surface 60.

In the middle part of FIG. 7, drive timings of the photoelectric converter 61A and the charge holder 61B of each pixel row 62 of the imaging sensor 5 are illustrated. In the middle part of FIG. 7, a vertical axis denotes a position of the pixel row 62 in the column direction Y.

A straight line GR illustrated in the middle part of FIG. 7 shows a timing (a timing at which the global reset driving is performed) at which each photoelectric converter 61A included in the pixel row 62 is reset.

A straight line GS illustrated in the middle part of FIG. 7 shows a timing at which charges are transferred to the charge holder 61B from each photoelectric converter 61A included in the pixel row 62. A period surrounded by the straight line GR and the straight line GS at the right of the straight line GR shows an exposure period of the imaging sensor 5.

A straight line ST illustrated in the middle part of FIG. 7 shows a timing at which charges are held in the charge holder 61B.

A straight line RO illustrated in the middle part of FIG. 7 shows a timing at which the pixel signal corresponding to the charges held in the charge holder 61B is output from the imaging sensor 5.

A generation timing of each of the areas a1 to a9 of the captured image data IG generated based on the pixel signal output from the imaging sensor 5 by driving shown by the straight line RO is shown in the lower part of FIG. 7.

A timing at which a straight line IGt illustrated in the lower part of FIG. 7 overlaps with a lower end of a band-shaped region denoted by "a1" is a timing at which the generation of the area a1 of the captured image data IG is completed.

A timing at which the straight line IGt overlaps with a lower end of a band-shaped region denoted by "a2" is a timing at which the generation of the area a2 of the captured image data IG is completed.

A timing at which the straight line IGt overlaps with a lower end of a band-shaped region denoted by "a3" is a timing at which the generation of the area a3 of the captured image data IG is completed.

A timing at which the straight line IGt overlaps with a lower end of a band-shaped region denoted by "a4" is a timing at which the generation of the area a4 of the captured image data IG is completed.

A timing at which the straight line IGt overlaps with a lower end of a band-shaped region denoted by "a5" is a timing at which the generation of the area a5 of the captured image data IG is completed.

A timing at which the straight line IGt overlaps with a lower end of a band-shaped region denoted by "a6" is a timing at which the generation of the area a6 of the captured image data IG is completed.

A timing at which the straight line IGt overlaps with a lower end of a band-shaped region denoted by "a7" is a timing at which the generation of the area a7 of the captured image data IG is completed.

A timing at which the straight line IGt overlaps with a lower end of a band-shaped region denoted by "a8" is a timing at which the generation of the area a8 of the captured image data IG is completed.

A timing at which the straight line IGt overlaps with a lower end of a band-shaped region denoted by "a9" is a timing at which the generation of the area a9 of the captured image data IG is completed.

In a case where the automatic shutter mode is started, the trigger range TR is set by the user. Then, an instruction to transition to a state of waiting for an automatic shutter is provided by operating the operation unit 14.

In a case where this instruction is provided, the global reset driving illustrated by the straight line GR is performed under control of the drive control unit 11A, and the photoelectric converter 61A is reset at the same time in all pixel rows 62. Accordingly, exposure is started at the same timing in all pixel rows 62.

Then, in a case where a predetermined exposure time elapses, the global shutter driving illustrated by the straight line GS and the straight line ST is performed under control of the drive control unit 11A. Accordingly, charges are transferred to the charge holder 61B from the photoelectric converter 61A at the same time in all pixel rows 62, and the charges are held in the charge holder 61B. The exposure is ended at the same timing in all pixel rows 62.

After the global shutter driving illustrated by the straight line GS and the straight line ST is performed, the rolling reading driving illustrated by the straight line RO is performed in the subsequent frame period under control of the drive control unit 11A.

In the rolling reading driving, the drive control unit 11A sequentially selects the pixel row from the upper end toward the lower end of the imaging surface 60 and reads out the pixel signal from the selected pixel row 62 as illustrated by the straight line RO.

At the same time as the start of the subsequent frame period, the imaging driving that is the set of the global shutter driving illustrated by the straight line GR, the global reset driving illustrated by the straight line GS and the straight line ST, and the rolling reading driving illustrated by the straight line RO is started under control of the drive control unit 11A. In such a manner, the imaging driving is consecutively performed in a case where the above instruction is provided.

In a case where a short time elapses from the start of the reading of the pixel signal illustrated by the straight line RO, each area of the captured image data IG is generated based on the pixel signal read out from the imaging sensor 5 as illustrated by the straight line IGt.

The generation of the area a6 and the subsequent areas in the captured image data IG is completed during the frame period in which the imaging driving is started after the imaging driving for obtaining the pixel signal of the generation source of the captured image data IG is performed twice.

In a case where the areas of the captured image data IG are sequentially generated, the process of detecting the moving object from the generated areas is sequentially performed.

In the example in FIG. 7, it is assumed that the moving object M is not formed on the imaging surface 60 in the frame period immediately before the initial frame period. Accordingly, the moving object M is not included in the captured image data generated based on the straight line IGt at the left of FIG. 7.

In the initial frame period, the moving object M is formed in the light reception area A1. Thus, in a case where the processing of the pixel signal read out from the imaging sensor 5 by the imaging driving started in the initial frame period is started and time t1 at which the generation of the area a1 of the captured image data based on the pixel signal is reached, the presence of the moving object M in the area a1 of which the generation is completed at time t1 is detected by the moving object detection unit 11B by comparing the area a1 of the captured image data obtained by the imaging driving in the frame period immediately before the initial frame period with the area a1 of which the generation is completed at time t1.

In the second frame period, the moving object M is formed in the light reception area A2. Thus, in a case where the processing of the pixel signal read out from the imaging sensor 5 by the imaging driving started in the second frame period is started and time t2 at which the generation of the area a2 of the captured image data based on the pixel signal is reached, the presence of the moving object M in the area a2 of which the generation is completed at time t2 is detected by the moving object detection unit 11B by comparing the area a2 of the captured image data based on the pixel signal read out by the imaging driving in the initial frame period with the area a2 of which the generation is completed at time t2.

The recording control unit 11C determines a movement speed and a movement direction of the moving object M based on a change in position of the moving object M detected at time t1 and time t2 in the captured image data and a length of the frame period that is a time necessary for the change.

In a case where the determined movement direction intersects with the trigger range TR, the recording control unit 11C predicts the timing at which the moving object M overlaps with the trigger range TR. The prediction process for the timing is performed in a very short time. Thus, in the example in FIG. 7, the prediction process is ended sufficiently before the start of the fourth frame period.

In a case where the determined movement direction does not intersect with the trigger range TR, the recording control unit 11C determines the movement speed and the movement direction of the moving object M each time the moving object M is newly detected.

In the example in FIG. 7, it is predicted that the trigger range TR and the moving object M overlap during the frame period that is two frame periods away from the second frame period in which the moving object M detected at time t2 is imaged. Accordingly, the recording control unit 11C processes the pixel signal obtained by the imaging driving started in the fourth frame period as the signal for recording on the recording medium 21.

Accordingly, the subject can be imaged and recorded at a timing at which the moving object M enters the trigger range TR, and a desired captured image can be obtained without missing a chance to press the shutter.

Figure 8:
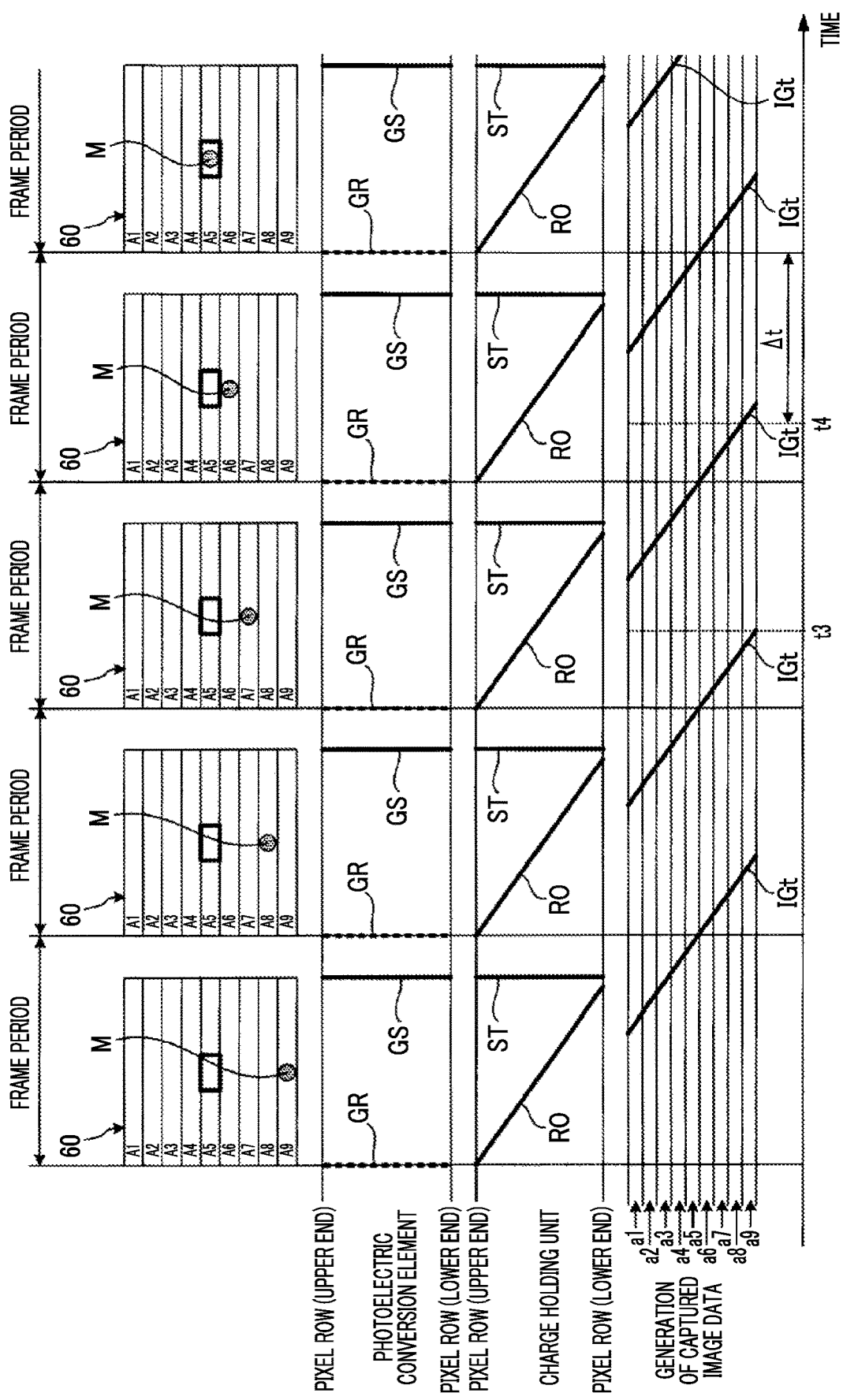
FIG. 8 is a timing chart illustrating another example of the operation at the time of the automatic shutter mode of the digital camera 100 illustrated in FIG. 1.

FIG. 8 is a timing chart illustrating another example of the operation at the time of the automatic shutter mode of the digital camera 100 illustrated in FIG. 1.

FIG. 8 illustrates an operation example in a case where the moving object M that is moving from the lower end side toward the upper end side of the imaging surface 60 is included in the subject being imaged by the digital camera 100. Each description shown in FIG. 8 is the same as FIG. 7.

In the timing chart illustrated in FIG. 8, each of the timing at which each imaging driving is performed and the timing at which each captured image data is generated is the same as FIG. 7.

In the example in FIG. 8, it is assumed that the moving object M is not formed on the imaging surface 60 in the frame period immediately before the initial frame period. That is, the moving object M is not included in any area in the captured image data generated based on the straight line IGt illustrated at the left end of FIG. 8.

In the initial frame period illustrated in FIG. 8, the moving object M is formed in the light reception area A9. Thus, in a case where the processing of the pixel signal read out from the imaging sensor 5 by the imaging driving started in the initial frame period is started and time t3 at which the generation of the area a9 of the captured image data IG based on the pixel signal is reached, the presence of the moving object M in the area a9 of which the generation is completed at time t3 is detected by the moving object detection unit 11B by comparing the area a9 of the captured image data IG based on the pixel signal read out by the imaging driving in the frame period immediately before the initial frame period with the area a9 of which the generation is completed at time t3.

In the second frame period illustrated in FIG. 8, the moving object M is formed in the light reception area A8. Thus, in a case where the processing of the pixel signal read out from the imaging sensor 5 by the imaging driving started in the second frame period is started and time t4 at which the generation of the area a8 of the captured image data IG based on the pixel signal is reached, the presence of the moving object M in the area a8 of which the generation is completed at time t4 is detected by the moving object detection unit 11B by comparing the area a8 of the captured image data IG based on the pixel signal read out by the imaging driving in the second frame period with the area a8 of which the generation is completed at time t4.

The recording control unit 11C determines the movement speed and the movement direction of the moving object M based on a change in position of the moving object M detected at time t3 and time t4 in the captured image data IG and the length of the frame period that is a time necessary for the change.

In a case where the determined movement direction intersects with the trigger range TR, the recording control unit 11C predicts the timing at which the moving object M overlaps with the trigger range TR. The prediction process for the timing is performed in a very short time. Thus, in the example in FIG. 8, the prediction process is ended sufficiently before the start of the fifth frame period.

In a case where the determined movement direction does not intersect with the trigger range TR, the recording control unit 11C determines the movement speed and the movement direction of the moving object M each time the moving object M is newly detected.

In the example in FIG. 8, it is predicted that the trigger range TR and the moving object M overlap during the frame period that is three frame periods away from the second frame period in which the moving object M detected at time t4 is imaged.

Accordingly, the recording control unit 11C processes the pixel signal obtained by the imaging driving started in the fifth frame period as the signal for recording on the recording medium 21. Accordingly, the subject can be imaged and recorded at a timing at which the moving object M enters the trigger range TR, and a desired captured image can be obtained without missing a chance to press the shutter.

As described thus far, according to the digital camera 100, the captured image data IG generated based on the pixel signal read out by the imaging driving is divided into areas. Each time each area is generated, a timing at which the moving object enters the trigger range TR is predicted by detecting the moving object included in the area. Thus, a time for completion of the prediction can be reduced, and a possibility of missing the chance to press the shutter can be reduced.

In order to predict a movement position of the moving object M, the captured image data IG of at least two frames is necessary. In addition, in a case where the moving object M is not at a position away from the trigger range TR when the prediction is completed, the automatic imaging cannot be performed at the timing at which the moving object M overlaps with the trigger range TR.

In the example illustrated in FIG. 7 and FIG. 8, timings at which the generation of the areas a1 to a4 on the upper side of the trigger range TR in the captured image data IG obtained by exposure is completed are present in the frame period that is one frame period away from the frame period in which the exposure is performed. That is, in the area on the upper side of the trigger range TR, a delay of one frame period occurs from the exposure until the moving object can be detected.

Thus, in a case where the area on the upper side of the area a5 that includes the trigger range TR in the captured image data IG is divided into at least three areas, the above effect can be obtained.

In addition, in the example illustrated in FIG. 7 and FIG. 8, timings at which the generation of the areas a6 to a9 on the lower side of the trigger range TR in the captured image data IG obtained by exposure is completed are present in the frame period that is two frame periods away from the frame period in which the exposure is performed. That is, in the area on the lower side of the trigger range TR, a delay of two frame periods occurs from the exposure until the moving object can be detected.

Thus, in a case where the area on the lower side of the area a5 that includes the trigger range TR in the captured image data is divided into at least four areas, the above effect can be obtained.

As the number of divisions of the captured image data is increased, detection accuracy of the moving object can be increased. However, in order to reduce a time and power necessary for the detection of the moving object, the number of divisions of the captured image data may be decreased.

Figure 9:
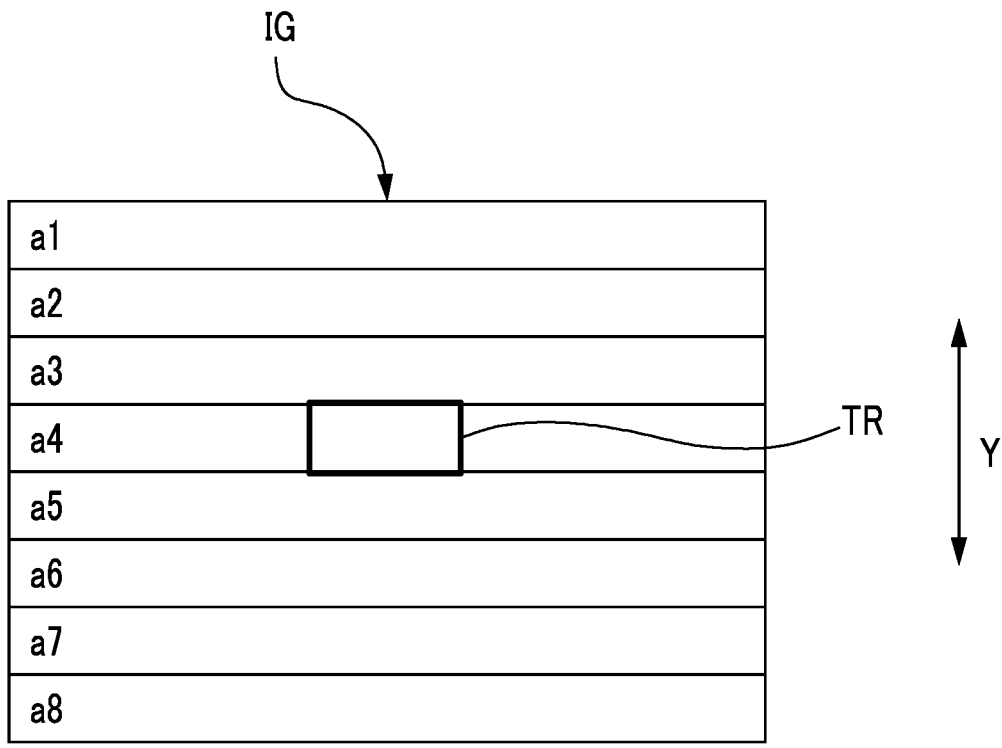
FIG. 9 is a diagram illustrating a modification example of the example of dividing captured image data IG illustrated in FIG. 6.

FIG. 9 is a diagram illustrating a modification example of the example of dividing the captured image data IG illustrated in FIG. 6.

In the example illustrated in FIG. 9, the captured image data IG is divided into total eight areas including the area a4 that is the first area and includes the trigger range TR, three second areas (the area a1, the area a2, and the area a3) on the upper side of the first area, and four third areas (the area a5, the area a6, the area a7, and the area a8) on the lower side of the first area. By decreasing the number of divisions from the example in FIG. 6, the time and power consumption necessary for the detection of the moving object can be reduced.

In the areas of the captured image data IG, the area on the upper side of the area including the trigger range TR and the area on the lower side of the area including the trigger range TR may have different widths in the column direction Y.

Figure 10:
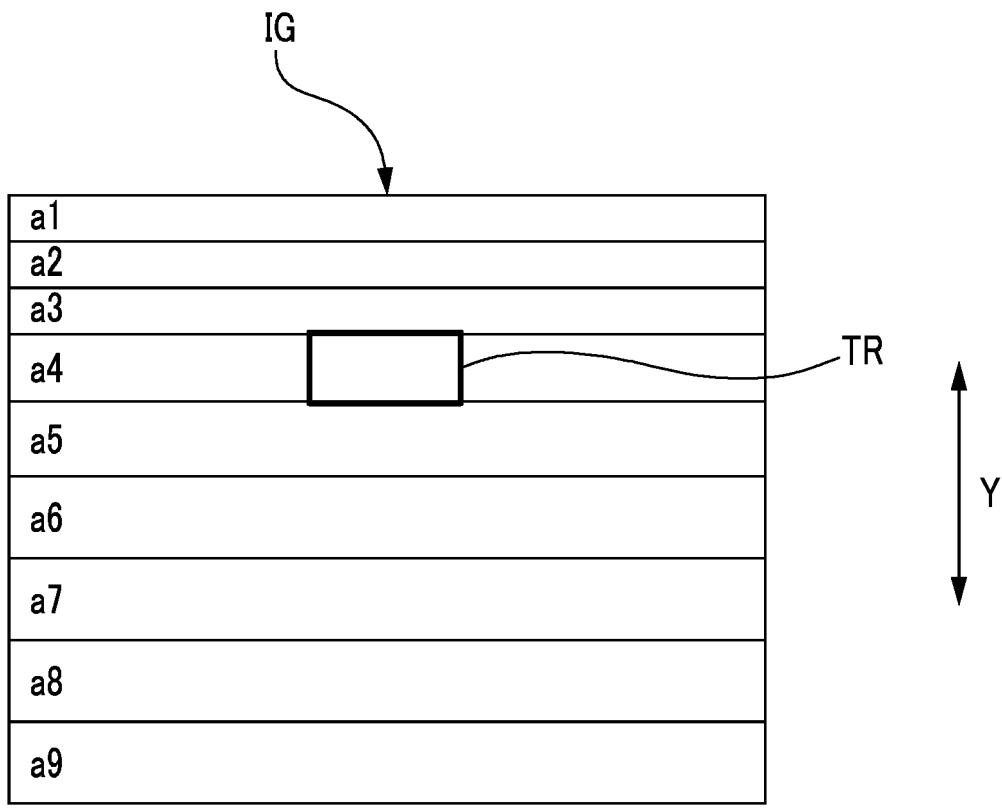
FIG. 10 is a diagram illustrating another modification example of the example of dividing captured image data IG illustrated in FIG. 6.

FIG. 10 is a diagram illustrating another modification example of the example of dividing the captured image data IG illustrated in FIG. 6.

In the example illustrated in FIG. 10, the area a4 is the area including the trigger range TR, and the width of the areas a1 to a3 on the upper side of the area a4 is smaller than the width of the areas a5 to a9 on the lower side of the area a4.

According to the example illustrated in FIG. 10, even in a case where the trigger range TR is not set at the center of the captured image data IG, the part on the upper side of the area including the trigger range TR can be equally divided, and the part on the lower side of the area including the trigger range TR can be equally divided.

Accordingly, in each of the area on the upper side of the area including the trigger range TR and the area on the lower side of the area including the trigger range TR, even detection accuracy of the moving object in each area can be achieved, and the detection accuracy of the moving object can be increased.

As illustrated in FIG. 6 or FIG. 9, in a case where the area on the upper side of the area including the trigger range TR and the area on the lower side of the area including the trigger range TR have the same width, even detection accuracy of the moving object in all areas can be achieved. Thus, the position of the moving object can be more accurately predicted.

The driving example illustrated in FIG. 7 and FIG. 8 is an example in which the timings at which the generation of the areas a1 to a4 on the upper side of the trigger range TR in the captured image data IG obtained by exposure is completed are present in the frame period that is one frame period away from the frame period in which the exposure is performed. Hereinafter, a driving example in which the timings at which the generation of all areas of the captured image data IG obtained by exposure is completed are present in the frame period that is one frame period after the frame period in which the exposure is performed will be described.

Figure 11:
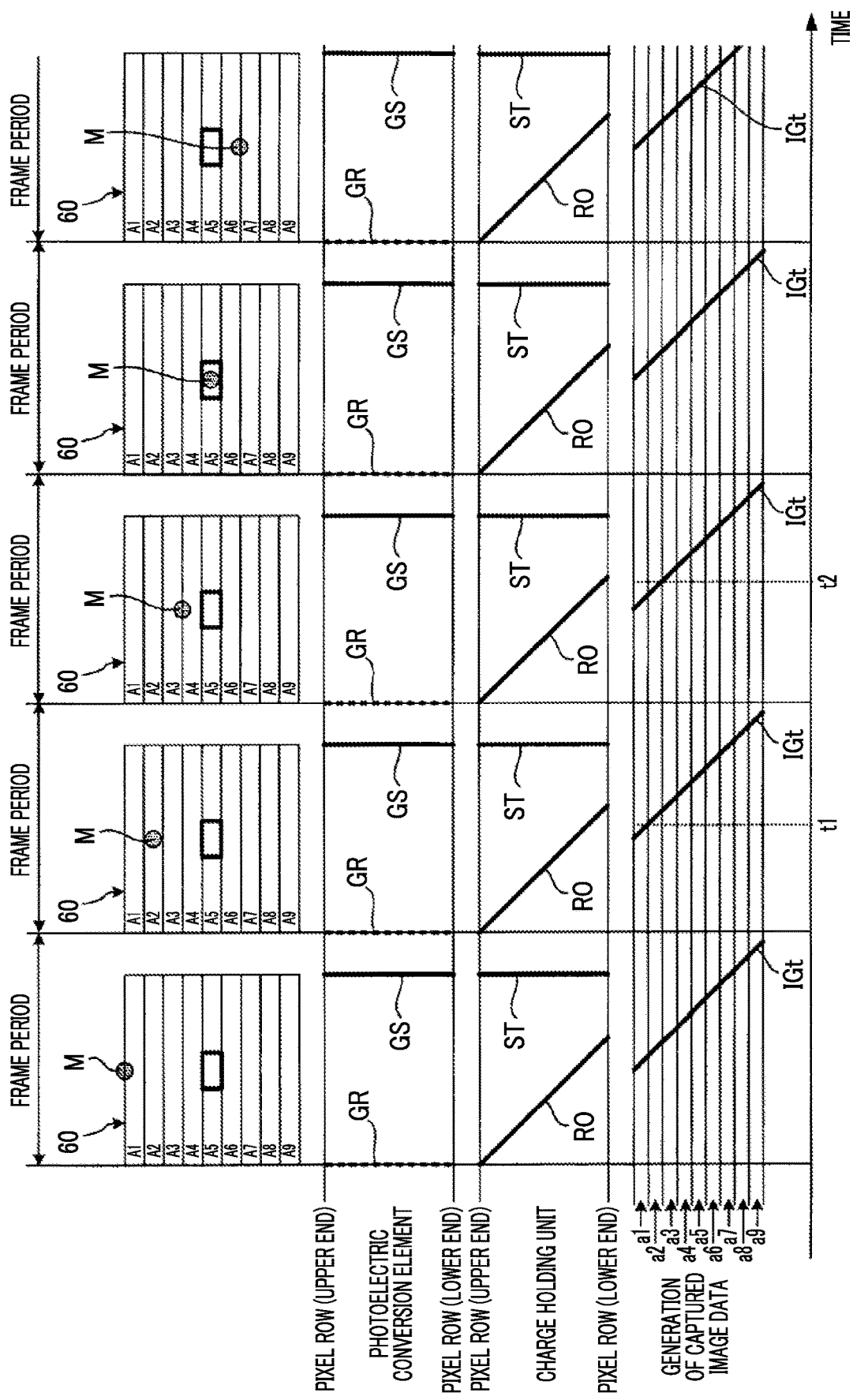
FIG. 11 is a timing chart illustrating another example of the operation at the time of the automatic shutter mode of the digital camera 100 illustrated in FIG. 1.

FIG. 11 is a timing chart illustrating another operation at the time of the automatic shutter mode of the digital camera 100 illustrated in FIG. 1.

FIG. 11 illustrates an operation example in a case where the moving object M that is moving from the upper end side toward the lower end side of the imaging surface 60 is included in the subject being imaged by the digital camera 100. In FIG. 11, an inclination and a position of each of the straight line RO and the straight line IGt are different from FIG. 7.

In the example illustrated in FIG. 11, the generation of the captured image data based on the image signal obtained by the imaging driving started in one frame period is completed during the frame period subsequent to the frame period.

In the example illustrated in FIG. 11, the moving object M is detected at each of time t1 and time t2, and the timing at which the moving object M overlaps with the trigger range TR is predicted immediately after time t2. The automatic imaging is performed in the fourth frame period started after time t2.

Figure 12:
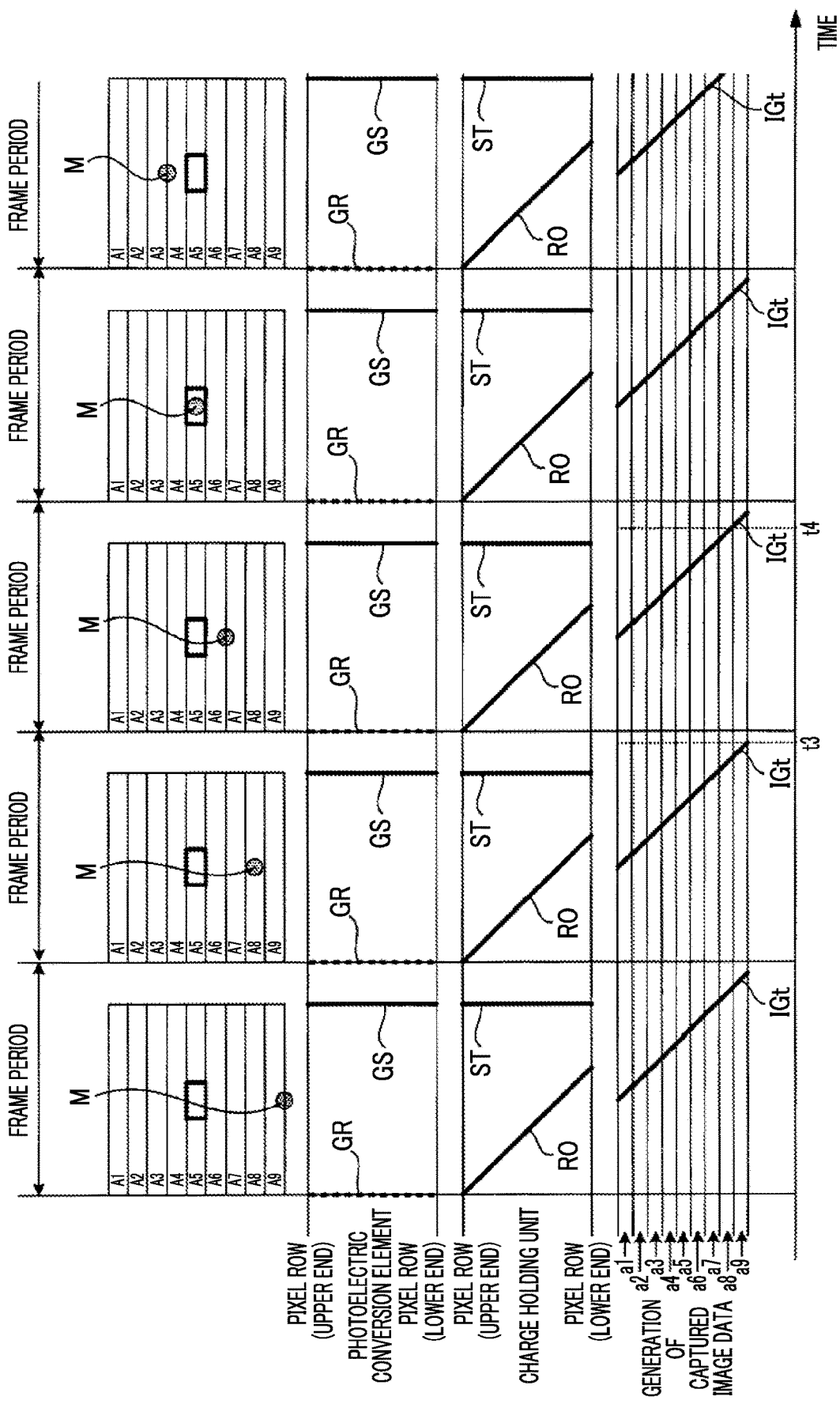
FIG. 12 is a timing chart illustrating another example of the operation at the time of the automatic shutter mode of the digital camera 100 illustrated in FIG. 1.

FIG. 12 is a timing chart illustrating another operation at the time of the automatic shutter mode of the digital camera 100 illustrated in FIG. 1.

FIG. 12 illustrates an operation example in a case where the moving object M that is moving from the lower end side toward the upper end side of the imaging surface 60 is included in the subject being imaged by the digital camera 100. In FIG. 12, an inclination and a position of each of the straight line RO and the straight line IGt are different from FIG. 8.

In the example illustrated in FIG. 12, the generation of the captured image data IG based on the image signal obtained by the imaging driving started in one frame period is completed during the frame period subsequent to the frame period.

In the example illustrated in FIG. 12, the moving object M is detected at each of time t3 and time t4, and the timing at which the moving object M overlaps with the trigger range TR is predicted immediately after time t4. The automatic imaging is performed in the fourth frame period started after time t4.

In the example illustrated in FIG. 11 and FIG. 12, the timings at which the generation of the areas a1 to a4 on the upper side of the trigger range TR in the captured image data IG obtained by exposure is completed are present in the frame period that is one frame period away from the frame period in which the exposure is performed. That is, in the area on the upper side of the trigger range TR, a delay of one frame period occurs from the exposure until the moving object can be detected.

Accordingly, in a case where the area on the upper side of the area a5 that includes the trigger range TR in the captured image data IG is divided into at least three areas, the automatic imaging can be performed at the timing at which the moving object that is moving from the upper side to the lower side overlaps with the trigger range.

In addition, in the example illustrated in FIG. 11 and FIG. 12, timings at which the generation of the areas a6 to a9 on the lower side of the trigger range TR in the captured image data IG obtained by exposure is completed are present in the frame period that is one frame period away from the frame period in which the exposure is performed. That is, in the area on the lower side of the trigger range TR, a delay of one frame period occurs from the exposure until the moving object can be detected.

Accordingly, in a case where the area on the lower side of the area a5 that includes the trigger range TR in the captured image data IG is divided into at least three areas, the automatic imaging can be performed at the timing at which the moving object that is moving from the lower side to the upper side overlaps with the trigger range.

Figure 13:
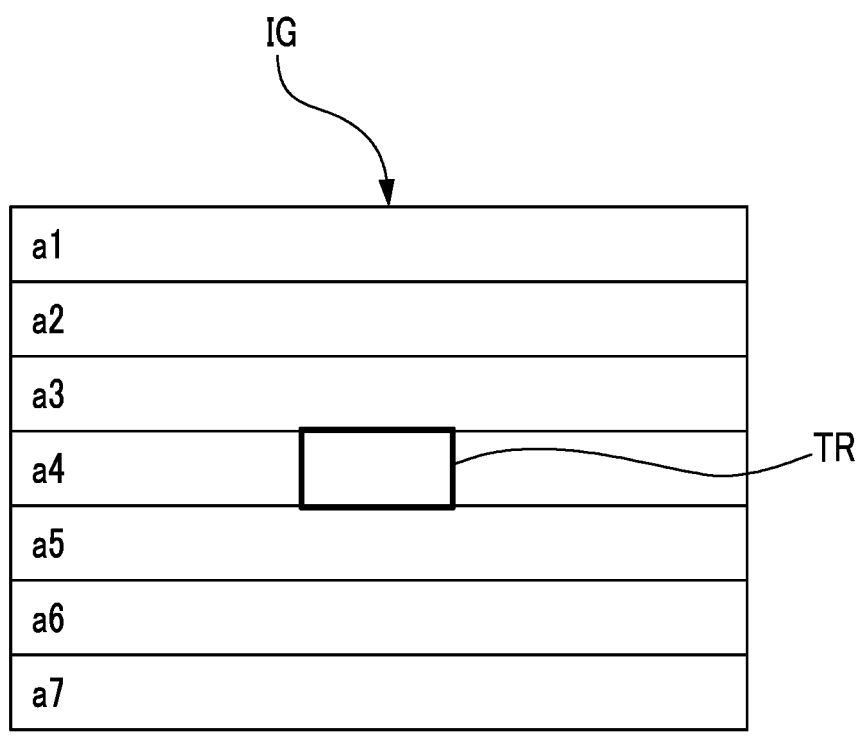
FIG. 13 is a diagram illustrating another modification example of the example of dividing captured image data IG illustrated in FIG. 6.

In a case where a speed of reading out the pixel signal from the imaging surface 60 is high, the automatic imaging can be performed at an accurate timing on the moving object that is moving at a high speed, by dividing the captured image data IG into at least total seven areas including the area a4 that is the first area and includes the trigger range TR, three second areas (the area a1, the area a2, and the area a3) on the upper side of the first area, three third areas (the area a5, the area a6, and the area a7) on the lower side of the first area as illustrated in FIG. 13.

Among the first area including the trigger range TR, at least three second areas on the upper side of the first area, and at least three third areas on the lower side of the first area in the captured image data IG, the moving object detection unit 11B may control the total number of the second areas and the third areas based on the focal length (a position of the zoom lens) of the imaging optical system.

In a case where the focal length is short, an angle of view is wide. Thus, a possibility that a subject different from the moving object to be detected enters the angle of view is increased. In addition, since an effect of vibration or the like of the digital camera 100 on the captured image data is increased, a possibility of erroneously detecting a non-moving subject as the moving object is increased.

Therefore, in a case where the focal length is less than or equal to a predetermined threshold value, the moving object detection unit 11B increases the total number from the total number in a case where the focal length exceeds the threshold value. By increasing the total number, the detection accuracy of the moving object is increased. Thus, the automatic imaging at an accurate timing can be performed by avoiding erroneous detection of the moving object.

Figure 14:
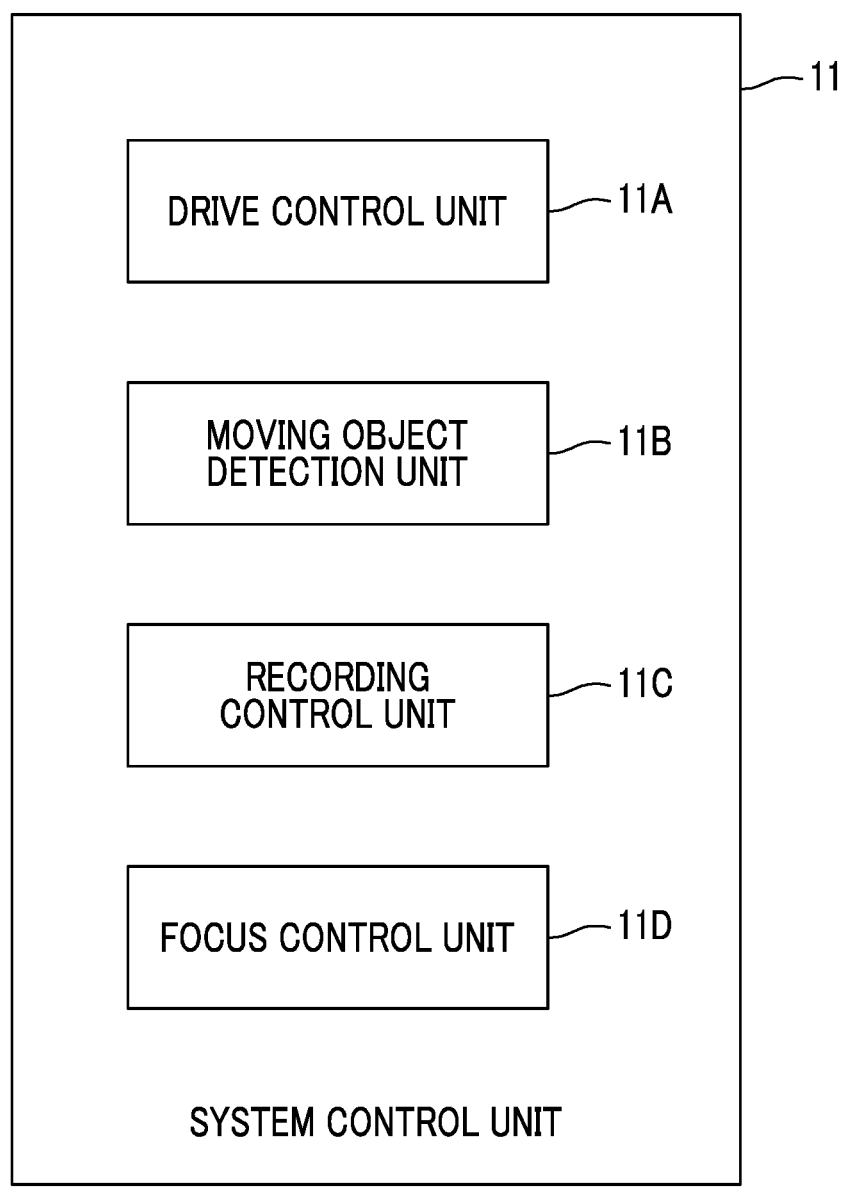
FIG. 14 is a diagram illustrating a modification example of function blocks of the system control unit 11 in the digital camera 100 illustrated in FIG. 1.

FIG. 14 is a diagram illustrating a modification example of the function blocks of the system control unit 11 in the digital camera 100 illustrated in FIG. 1. The system control unit 11 illustrated in FIG. 14 has the same configuration as FIG. 5 except that a focus control unit 11D is added.

By executing the programs recorded in the ROM of the memory 16 including the imaging control program, the system control unit 11 illustrated in FIG. 14 functions as an imaging control device that comprises the drive control unit 11A, the moving object detection unit 11B, the recording control unit 11C, and the focus control unit 11D.

In a case where the moving object is detected, the moving object detection unit 11B of the system control unit 11 illustrated in FIG. 14 calculates a distance from the imaging surface 60 to the moving object and records the distance in the RAM.

For example, a phase difference detection pixel can be arranged in each of the areas A1 to A9 of the imaging surface 60. A phase difference can be obtained based on the pixel signal output from the phase difference detection pixel included in the area of the captured image data IG, and the distance to the moving object can be calculated from the phase difference.

In a case where the timing at which a moving object M1 enters the trigger range TR is predicted by the recording control unit 11C based on a change in position of the moving object (denoted by M1) detected by the moving object detection unit 11B, the focus control unit 11D predicts the distance from the imaging surface 60 to the moving object M1 in the frame period that includes the predicted timing, based on a difference between a time at which the moving object M1 is most recently detected and a start time of the imaging driving executed in the frame period including the predicted timing, and a change of the distance from the imaging surface 60 to the moving object M1.

The focus control unit 11D controls the focal position (the position of a principal point of the focus lens) of the imaging optical system arranged in front of the imaging sensor 5 in the frame period based on the predicted distance. Specifically, the position of the principal point of the focus lens is controlled such that the focal position is present at the distance.

For example, in the example illustrated in FIG. 7, in a case where the moving object M is detected at time t2 and the frame period (the fourth frame period in FIG. 7) that includes the timing at which the moving object M enters the trigger range TR is determined, a difference $\Delta t$ between time t2 and the start time of the fourth frame period is calculated by the focus control unit 11D.

The focus control unit 11D calculates the movement speed of the moving object M in the optical axis direction of the imaging optical system based on the distance to the moving object M detected at time t1 and the distance to the moving object M detected at time t2.

From the movement speed and the difference $\Delta t$, the focus control unit 11D predicts the distance from the imaging surface 60 to the moving object M in the frame period including the timing at which the moving object M enters the trigger range TR. That is, the distance from the imaging surface 60 to the moving object M at a time after an elapse of $\Delta t$ from time t2 is predicted.

Control for setting the focal position at the predicted distance is performed immediately before the start of the frame period. Accordingly, in the frame period, the automatic imaging can be performed in a state where a focus is set on the moving object M.

In the same manner, in the example illustrated in FIG. 8, in a case where the moving object M is detected at time t4 and the frame period (the fifth frame period in FIG. 8) that includes the timing at which the moving object M enters the trigger range TR is determined, the difference $\Delta t$ between time t4 and the start time of the fifth frame period is calculated by the focus control unit 11D.

The focus control unit 11D calculates the movement speed of the moving object M in the optical axis direction of the imaging optical system based on the distance to the moving object M detected at time t3 and the distance to the moving object M detected at time t4.

From the movement speed and the difference $\Delta t$, the focus control unit 11D predicts the distance from the imaging surface 60 to the moving object M in the frame period including the timing at which the moving object M enters the trigger range TR. That is, the distance from the imaging surface 60 to the moving object M at a time after an elapse of $\Delta t$ from time t4 is predicted.

The focal position is controlled to be at the predicted distance immediately before the start of the frame period.

Accordingly, the automatic imaging can be performed in a state where the moving object M is focused.

Next, a configuration of a smartphone as the imaging apparatus according to the embodiment of the present invention will be described.

Figure 15:
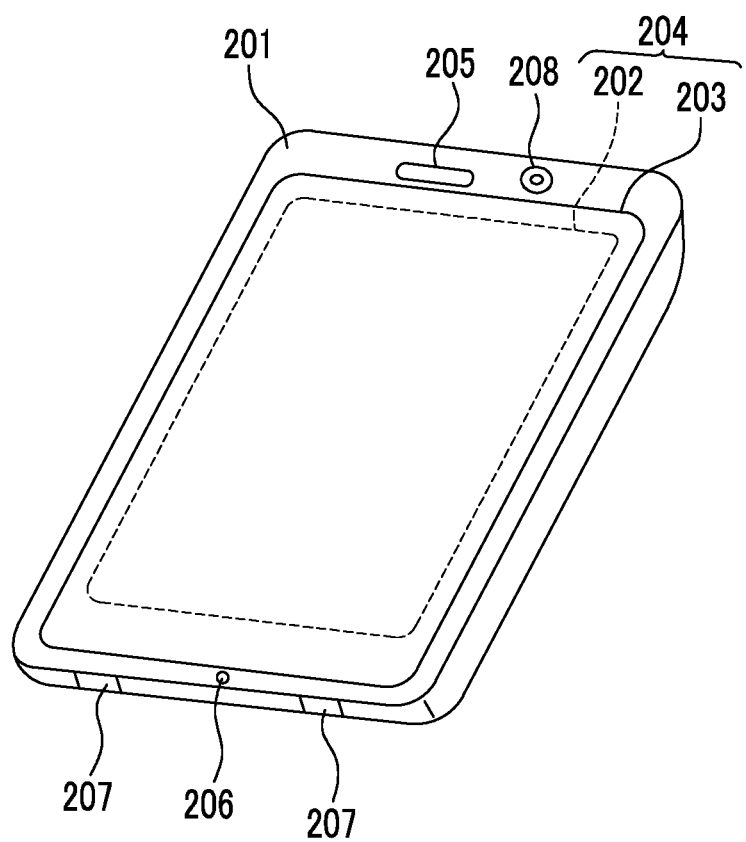
FIG. 15 illustrates an exterior of a smartphone 200 that is the imaging apparatus according to one embodiment of the present invention.

FIG. 15 illustrates an exterior of a smartphone 200 that is the imaging apparatus according to one embodiment of the present invention.

The smartphone 200 illustrated in FIG. 15 includes a casing 201 having a flat plate shape and comprises a display and input unit 204 in which a display panel 202 as a display surface and an operation panel 203 as an input unit are integrated on one surface of the casing 201.

The casing 201 comprises a speaker 205, a microphone 206, an operation unit 207, and a camera unit 208. The configuration of the casing 201 is not for limitation and may employ, for example, a configuration in which the display surface and the input unit are independently disposed, or a configuration that has a folded structure or a sliding mechanism.

Figure 16:
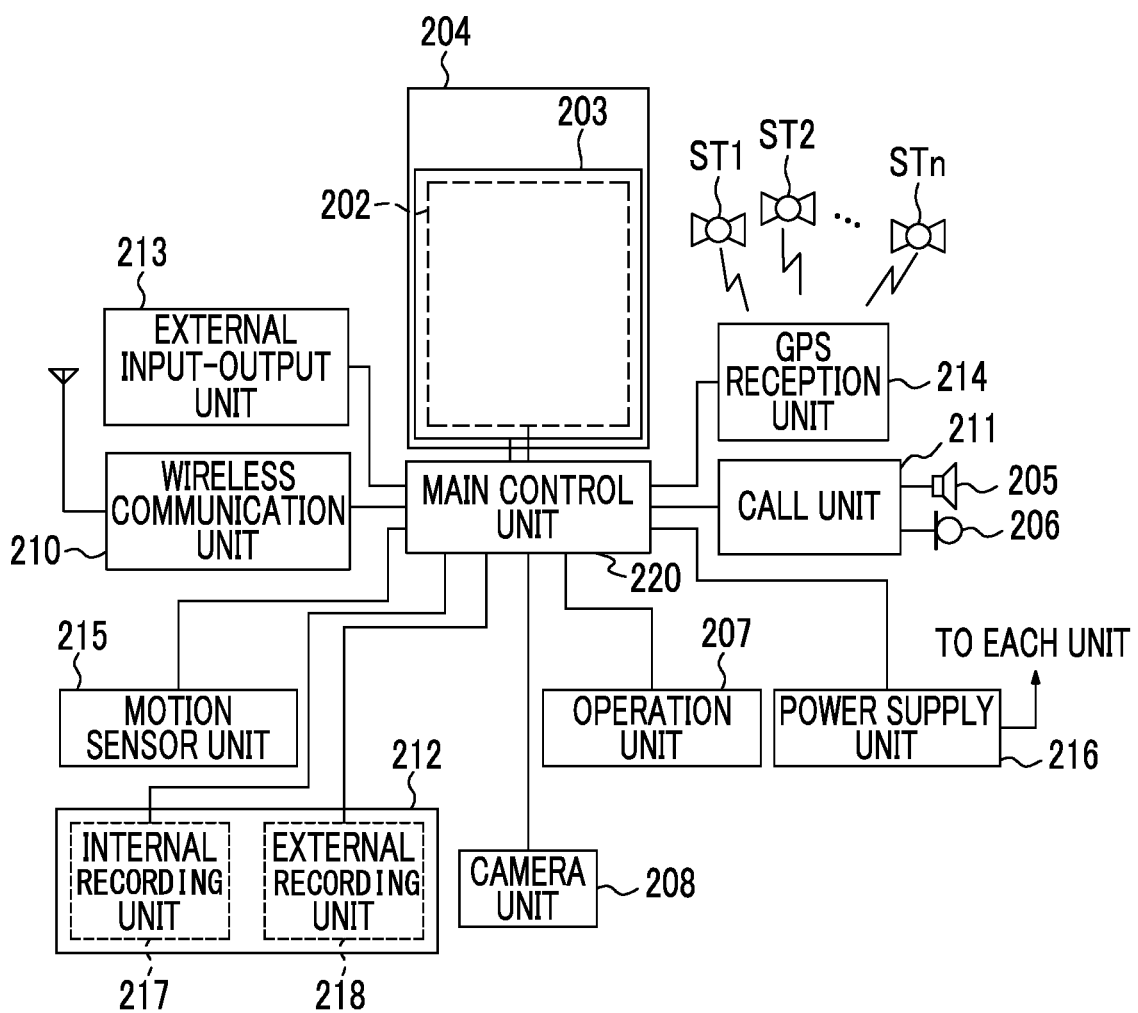
FIG. 16 is a block diagram illustrating a configuration of the smartphone 200 illustrated in FIG. 15.

FIG. 16 is a block diagram illustrating a configuration of the smartphone 200 illustrated in FIG. 15.

As illustrated in FIG. 16, a wireless communication unit 210, the display and input unit 204, a call unit 211, the operation unit 207, the camera unit 208, a recording unit 212, an external input-output unit 213, a global positioning system (GPS) reception unit 214, a motion sensor unit 215, a power supply unit 216, and a main control unit 220 are comprised as main constituents of the smartphone.

In addition, a wireless communication function of performing mobile wireless communication with a base station apparatus BS, not illustrated, through a mobile communication network NW, not illustrated, is provided as a main function of the smartphone 200.

The wireless communication unit 210 performs wireless communication with the base station apparatus BS accommodated in the mobile communication network NW in accordance with an instruction from the main control unit 220. By using the wireless communication, transmission and reception of various file data such as voice data and image data, electronic mail data, or the like and reception of web data, streaming data, or the like are performed.

The display and input unit 204 is a so-called touch panel that visually delivers information to the user by displaying images (still images and motion images), text information, or the like and detects a user operation with respect to the displayed information under control of the main control unit 220. The display and input unit 204 comprises the display panel 202 and the operation panel 203.

The display panel 202 uses a liquid crystal display (LCD), an organic electro-luminescence display (OELD), or the like as a display device.

The operation panel 203 is a device that is placed such that an image displayed on the display surface of the display panel 202 can be visually recognized, is operated by a finger of the user or a stylus, and detects one or a plurality of coordinates. In a case where the device is operated by the finger of the user or the stylus, a detection signal generated by the operation is output to the main control unit 220. Next, the main control unit 220 detects an operation position (coordinates) on the display panel 202 based on the received detection signal.

As illustrated in FIG. 16, the display panel 202 and the operation panel 203 of the smartphone 200 illustrated as the imaging apparatus according to one embodiment of the present invention are integrated and constitute the display and input unit 204. The operation panel 203 is arranged to completely cover the display panel 202.

In a case where such arrangement is employed, the operation panel 203 may have a function of detecting the user operation even in a region outside the display panel 202. In other words, the operation panel 203 may comprise a detection region (hereinafter, referred to as a display region) for an overlapping part in overlap with the display panel 202 and a detection region (hereinafter, referred to as a non-display region) for an edge part other than the overlapping part that is not in overlap with the display panel 202.

The size of the display region and the size of the display panel 202 may completely match, but both sizes do not need to match. In addition, the operation panel 203 may comprise two sensitive regions of the edge part and an inner part other than the edge part. Furthermore, the width of the edge part is appropriately designed depending on the size and the like of the casing 201.

Furthermore, as a position detection method employed in the operation panel 203, a matrix switch method, a resistive film method, a surface acoustic wave method, an infrared method, an electromagnetic induction method, an electrostatic capacitive method, and the like are exemplified, and any of the methods can be employed.

The call unit 211 comprises the speaker 205 or the microphone 206 and converts voice of the user input through the microphone 206 into voice data processable in the main control unit 220 and outputs the voice data to the main control unit 220, or decodes voice data received by the wireless communication unit 210 or the external input-output unit 213 and outputs the decoded voice data from the speaker 205.

In addition, as illustrated in FIG. 15, for example, the speaker 205 can be mounted on the same surface as a surface on which the display and input unit 204 is disposed, and the microphone 206 can be mounted on a side surface of the casing 201.

The operation unit 207 is a hardware key that uses a key switch or the like, and receives an instruction from the user. For example, as illustrated in FIG. 15, the operation unit 207 is a push-button type switch that is mounted on a side surface of the casing 201 of the smartphone 200 and enters an ON state in a case where the switch is pressed by the finger or the like, and enters an OFF state by restoring force of a spring or the like in a case where the finger is released.

In the recording unit 212, a control program and control data of the main control unit 220, application software, address data in which a name, a telephone number, or the like of a communication counterpart is associated, transmitted and received electronic mail data, web data downloaded by web browsing, and downloaded contents data are recorded, and streaming data or the like is temporarily recorded. In addition, the recording unit 212 is configured with an internal recording unit 217 incorporated in the smartphone and an external recording unit 218 that includes a slot for an attachable and detachable external memory.

Each of the internal recording unit 217 and the external recording unit 218 constituting the recording unit 212 is implemented using a storage medium such as a memory (for example, a MicroSD (registered trademark) memory) of a flash memory type, a hard disk type, a multimedia card micro type, or a card type, a random access memory (RAM), or a read only memory (ROM).

The external input-output unit 213 is an interface with all external apparatuses connected to the smartphone 200 and is directly or indirectly connected to other external apparatuses by communication or the like (for example, Universal Serial Bus (USB) or IEEE1394) or through a network (for example, the Internet, a wireless LAN, Bluetooth (registered trademark), radio frequency identification (RFID), infrared communication (Infrared Data Association (IrDA) (registered trademark)), Ultra Wideband (UWB) (registered trademark), or ZigBee (registered trademark)).

For example, the external apparatuses connected to the smartphone 200 include a wired/wireless headset, a wired/wireless external charger, a wired/wireless data port, a memory card and a subscriber identity module (SIM)/user identity module (UIM) card connected through a card socket, an external audio and video apparatus connected through an audio and video input/output (I/O) terminal, a wirelessly connected external audio and video apparatus, a smartphone connected in a wired/wireless manner, a personal computer connected in a wired/wireless manner, and an earphone.

The external input-output unit 213 can deliver data transferred from the external apparatuses to each constituent in the smartphone 200 or transfer data in the smartphone 200 to the external apparatuses.

The GPS reception unit 214 receives GPS signals transmitted from GPS satellites ST1 to STn, executes a position measurement calculation process based on the received plurality of GPS signals, and detects a position that includes a latitude, a longitude, and an altitude of the smartphone 200 in accordance with an instruction from the main control unit 220. When positional information can be acquired from the wireless communication unit 210 or the external input-output unit 213 (for example, a wireless LAN), the GPS reception unit 214 can detect the position using the positional information.

The motion sensor unit 215 comprises, for example, a three-axis acceleration sensor and detects a physical motion of the smartphone 200 in accordance with an instruction from the main control unit 220. By detecting the physical motion of the smartphone 200, a movement direction or an acceleration of the smartphone 200 is detected. The detection result is output to the main control unit 220.

The power supply unit 216 supplies power stored in a battery (not illustrated) to each unit of the smartphone 200 in accordance with an instruction from the main control unit 220.

The main control unit 220 comprises a microprocessor, operates in accordance with the control program and the control data recorded in the recording unit 212, and manages and controls each unit of the smartphone 200. In addition, the main control unit 220 has a mobile communication control function of controlling each unit of a communication system and an application processing function for performing voice communication or data communication through the wireless communication unit 210.

The application processing function is implemented by operating the main control unit 220 in accordance with the application software recorded in the recording unit 212. For example, the application processing function is an infrared communication function of performing data communication with an opposing apparatus by controlling the external input-output unit 213, an electronic mail function of transmitting and receiving electronic mails, or a web browsing function of browsing a web page.

In addition, the main control unit 220 has an image processing function such as displaying a video on the display and input unit 204 based on image data (data of a still image or a motion image) such as reception data or downloaded streaming data.

The image processing function refers to a function of causing the main control unit 220 to decode the image data, perform image processing on the decoding result, and display an image on the display and input unit 204.

Furthermore, the main control unit 220 executes display control for the display panel 202 and operation detection control for detecting the user operation through the operation unit 207 and the operation panel 203.

By executing the display control, the main control unit 220 displays an icon for starting the application software or a software key such as a scroll bar or displays a window for creating an electronic mail.

The scroll bar refers to a software key for receiving an instruction to move a display part of a large image or the like that does not fit in the display region of the display panel 202.

In addition, by executing the operation detection control, the main control unit 220 detects the user operation through the operation unit 207, receives an operation with respect to the icon and an input of a text string in an input field of the window through the operation panel 203, or receives a request for scrolling the display image through the scroll bar.

Furthermore, by executing the operation detection control, the main control unit 220 has a touch panel control function of determining whether the operation position on the operation panel 203 is in the overlapping part (display region) in overlap with the display panel 202 or the other edge part (non-display region) not in overlap with the display panel 202 and controlling the sensitive region of the operation panel 203 or a display position of the software key.

In addition, the main control unit 220 can detect a gesture operation with respect to the operation panel 203 and execute a preset function depending on the detected gesture operation.

The gesture operation is not a simple touch operation in the relate art and means an operation of drawing a trajectory by the finger or the like, designating a plurality of positions at the same time, or drawing a trajectory for at least one of the plurality of positions as a combination thereof.

The camera unit 208 includes configurations other than the external memory control unit 20, the recording medium 21, the display controller 22, the display surface 23, and the operation unit 14 in the digital camera 100 illustrated in FIG. 1.

The captured image data of RAW format or JPEG format generated by the camera unit 208 can be recorded in the recording unit 212 instead of the recording medium 21 or be output through the external input-output unit 213 or the wireless communication unit 210.

In the smartphone 200 illustrated in FIG. 15, the camera unit 208 is mounted on the same surface as the display and input unit 204. However, the mount position of the camera unit 208 is not for limitation purposes. The camera unit 208 may be mounted on a rear surface of the display and input unit 204.

In addition, the camera unit 208 can be used in various functions of the smartphone 200. For example, an image acquired by the camera unit 208 can be displayed on the display panel 202, or the image of the camera unit 208 can be used as one of operation inputs of the operation panel 203.

In addition, in a case where the GPS reception unit 214 detects the position, the position can be detected by referring to the image from the camera unit 208. Furthermore, by referring to the image from the camera unit 208, an optical axis direction of the camera unit 208 of the smartphone 200 can be determined, or the current usage environment can be determined without using the three-axis acceleration sensor or using the three-axis acceleration sensor. The image from the camera unit 208 can also be used in the application software.

Besides, image data of a still image or a motion image to which the positional information acquired by the GPS reception unit 214, voice information (may be text information acquired by performing voice to text conversion by the main control unit or the like) acquired by the microphone 206, attitude information acquired by the motion sensor unit 215, or the like is added can be recorded in the recording unit 212 or be output through the external input-output unit 213 or the wireless communication unit 210.

Even in the smartphone 200 having the above configuration, the moving object that moves at a high speed can be imaged at an accurate timing and be recorded as the captured image data.

As described thus far, the following matters are disclosed in the present specification.

(1) An imaging control device comprising a drive control unit that controls a driver of an imaging sensor which includes a plurality of pixels each including a photoelectric converter and a charge holder which holds charges transferred from the photoelectric converter and from which a signal corresponding to the charges is read out by a reading circuit, and an imaging surface on which a plurality of pixel rows each including a plurality of the pixels arranged in a first direction are arranged in a second direction orthogonal to the first direction to consecutively perform driving of starting exposure of the plurality of pixels by resetting the photoelectric converter of each of the plurality of pixels at the same time, ending the exposure by transferring the charges accumulated in the photoelectric converter of each of the plurality of pixels by the exposure to the charge holder at the same time, and then, sequentially selecting the pixel row from one end side to another end side of the imaging surface in the second direction, and reading out a pixel signal corresponding to the charges held in the charge holder of the selected pixel row, a moving object detection unit that performs a process of dividing captured image data generated based on the pixel signal read out by the driving into a plurality of areas in the second direction and detecting a moving object from the area based on a result of comparing the generated area with the same area as the area in the captured image data generated based on the pixel signal read out by the driving performed before the driving, and a recording control unit that predicts a timing at which a range set in the captured image data overlaps with the moving object based on a change in position of the moving object detected by the moving object detection unit and processes the pixel signal read out by the driving executed in a period including the timing as a signal for recording on a recording medium.

(2) The imaging control device according to (1), in which a timing at which generation of an area that is generated based on the pixel signal read out from the pixel row on the other end side of the imaging surface from the pixel row from which the pixel signal of a generation source of a first area including the range in the captured image data generated based on the pixel signal read out by the driving is completed is present in a period in which the driving is performed after the driving is performed twice, and the plurality of areas include a first area including the range, at least three second areas that are generated based on the pixel signal read out from the pixel row on the one end side of the imaging surface from the pixel row from which the pixel signal of the generation source of the first area is read out, and at least three third areas that are generated based on the pixel signal read out from the pixel row on the other end side of the imaging surface from the pixel row from which the pixel signal of the generation source of the first area is read out.

(3) The imaging control device according to (2), in which the number of second areas is different from the number of third areas.

(4) The imaging control device according to (1), in which a timing at which generation of the captured image data generated based on the pixel signal read out by the driving is completed is present in a period in which the driving subsequent to the driving is performed, and the plurality of areas include a first area including the range, at least three second areas that are generated based on the pixel signal read out from the pixel row on the one end side of the imaging surface from the pixel row from which the pixel signal of the generation source of the first area is read out, and at least three third areas that are generated based on the pixel signal read out from the pixel row on the other end side of the imaging surface from the pixel row from which the pixel signal of the generation source of the first area is read out.

(5) The imaging control device according to (2) or (4), in which the number of second areas is the same as the number of third areas.

(6) The imaging control device according to any one of (2) to (5), in which a width of the second areas in the second direction is different from a width of the third areas in the second direction.

(7) The imaging control device according to any one of (2) to (6), in which the moving object detection unit controls a total number of the second areas and the third areas based on a focal length of an imaging optical system arranged in front of the imaging sensor.

(8) The imaging control device according to (7), in which in a case where the focal length is less than or equal to a threshold value, the moving object detection unit increases the total number from the total number in a case where the focal length exceeds the threshold value.

(9) The imaging control device according to any one of (1) to (8), further comprising a focus control unit that, in a case where the moving object is detected by the moving object detection unit and the timing is predicted based on the moving object, predicts a distance to the moving object in a period based on a difference between a time at which the moving object is detected and a start time of the driving executed in the period including the predicted timing, and a change of a distance from the imaging surface to the moving object detected by the moving object detection unit, and controls a focal position of an imaging optical system arranged in front of the imaging sensor in the period based on the predicted distance.

(10) An imaging apparatus comprising the imaging control device according to any one of (1) to (9), the imaging sensor, and the driver.

(11) An imaging control method comprising a drive control step of controlling a driver of an imaging sensor which includes a plurality of pixels each including a photoelectric converter and a charge holder which holds charges transferred from the photoelectric converter and from which a signal corresponding to the charges is read out by a reading circuit, and an imaging surface on which a plurality of pixel rows each including a plurality of the pixels arranged in a first direction are arranged in a second direction orthogonal to the first direction to consecutively perform driving of starting exposure of the plurality of pixels by resetting the photoelectric converter of each of the plurality of pixels at the same time, ending the exposure by transferring the charges accumulated in the photoelectric converter of each of the plurality of pixels by the exposure to the charge holder at the same time, and then, sequentially selecting the pixel row from one end side to another end side of the imaging surface in the second direction, and reading out a pixel signal corresponding to the charges held in the charge holder of the selected pixel row, a moving object detection step of performing a process of dividing captured image data generated based on the pixel signal read out by the driving into a plurality of areas in the second direction and detecting a moving object from the area based on a result of comparing the generated area with the same area as the area in the captured image data generated based on the pixel signal read out by the driving performed before the driving, and a recording control step of predicting a timing at which a range set in the captured image data overlaps with the moving object based on a change in position of the moving object detected in the moving object detection step and processing the pixel signal read out by the driving executed in a period including the timing as a signal for recording on a recording medium.

(12) The imaging control method according to (11), in which a timing at which generation of an area that is generated based on the pixel signal read out from the pixel row on the other end side of the imaging surface from the pixel row from which the pixel signal of a generation source of a first area including the range in the captured image data generated based on the pixel signal read out by the driving is completed is present in a period in which the driving is performed after the driving is performed twice, and the plurality of areas include the first area, at least three second areas that are generated based on the pixel signal read out from the pixel row on the one end side of the imaging surface from the pixel row from which the pixel signal of the generation source of the first area is read out, and at least four third areas that are generated based on the pixel signal read out from the pixel row on the other end side of the imaging surface from the pixel row from which the pixel signal of the generation source of the first area is read out.

(13) The imaging control method according to (12), in which the number of second areas is different from the number of third areas.

(14) The imaging control method according to (11), in which a timing at which generation of the captured image data generated based on the pixel signal read out by the driving is completed is present in a period in which the driving subsequent to the driving is performed, and the plurality of areas include a first area including the range, at least three second areas that are generated based on the pixel signal read out from the pixel row on the one end side of the imaging surface from the pixel row from which the pixel signal of the generation source of the first area is read out, and at least three third areas that are generated based on the pixel signal read out from the pixel row on the other end side of the imaging surface from the pixel row from which the pixel signal of the generation source of the first area is read out.

(15) The imaging control method according to (12) or (14), in which the number of second areas is the same as the number of third areas.

(16) The imaging control method according to any one of (12) to (15), in which a width of the second areas in the second direction is different from a width of the third areas in the second direction.

(17) The imaging control method according to any one of (12) to (16), in which in the moving object detection step, a total number of the second areas and the third areas is controlled based on a focal length of an imaging optical system arranged in front of the imaging sensor.

(18) The imaging control method according to (17), in which in a case where the focal length is less than or equal to a threshold value, in the moving object detection step, the total number is increased from the total number in a case where the focal length exceeds the threshold value.

(19) The imaging control method according to any one of (11) to (18), further comprising a focus control step of, in a case where the moving object is detected in the moving object detection step and the timing is predicted based on the moving object, predicting a distance to the moving object in a period based on a difference between a time at which the moving object is detected and a start time of the driving executed in the period including the predicted timing, and a change of a distance from the imaging surface to the moving object detected in the moving object detection step, and controlling a focal position of an imaging optical system arranged in front of the imaging sensor in the period based on the predicted distance.

(20) An imaging control program causing a computer to execute a drive control step of controlling a driver of an imaging sensor which includes a plurality of pixels each including a photoelectric converter and a charge holder which holds charges transferred from the photoelectric converter and from which a signal corresponding to the charges is read out by a reading circuit, and an imaging surface on which a plurality of pixel rows each including a plurality of the pixels arranged in a first direction are arranged in a second direction orthogonal to the first direction to consecutively perform driving of starting exposure of the plurality of pixels by resetting the photoelectric converter of each of the plurality of pixels at the same time, ending the exposure by transferring the charges accumulated in the photoelectric converter of each of the plurality of pixels by the exposure to the charge holder at the same time, and then, sequentially selecting the pixel row from one end side to another end side of the imaging surface in the second direction, and reading out a pixel signal corresponding to the charges held in the charge holder of the selected pixel row, a moving object detection step of performing a process of dividing captured image data generated based on the pixel signal read out by the driving into a plurality of areas in the second direction and detecting a moving object from the area based on a result of comparing the generated area with the same area as the area in the captured image data generated based on the pixel signal read out by the driving performed before the driving, and a recording control step of predicting a timing at which a range set in the captured image data overlaps with the moving object based on a change in position of the moving object detected in the moving object detection step and processing the pixel signal read out by the driving executed in a period including the timing as a signal for recording on a recording medium.

According to the present invention, an imaging control device, an imaging apparatus, an imaging control method, and an imaging control program capable of starting imaging for recording in a state where a subject is at a desired position in a case where the subject is imaged by driving an imaging sensor based on a global shutter method can be provided.

EXPLANATION OF REFERENCES

100: digital camera
1: imaging lens

2: stop
4: lens control unit
5: imaging sensor
60: imaging surface
61: pixel
61A: photoelectric converter
61B: charge holder
61C: charge transfer unit
61D: floating diffusion
61E: reading circuit
61F: charge emission region
62: pixel row
63: drive circuit
64: signal processing circuit
65: signal line
70: N-type substrate
71: P-well layer
72: reading electrode
73: N-type impurity layer
74: P-type impurity layer
75: region
76: transfer electrode
77: reset transistor
78: output transistor
79: selection transistor
RG: reset electrode
8: lens drive unit
9: stop drive unit
10: imaging sensor driver
11: system control unit
11A: drive control unit
11B: moving object detection unit
11C: recording control unit
11D: focus control unit
IG: captured image data
14: operation unit
15: memory control unit
16: memory
17: digital signal processing unit
20: external memory control unit
21: recording medium
22: display controller
23: display surface
24: control bus
25: data bus
40: lens device
TR: trigger range
GR, GS, RO, ST, IGt: straight line
M: moving object
200: smartphone
201: casing
202: display panel
203: operation panel
204: display and input unit
205: speaker
206: microphone
207: operation unit
208: camera unit
210: wireless communication unit
211: call unit
212: recording unit
213: external input-output unit
214: GPS reception unit
215: motion sensor unit
216: power supply unit
217: internal recording unit
218: external recording unit
220: main control unit
ST1 to STn: GPS satellite

What is claimed is:

1. An imaging control device comprising:
a processor configured to
control a driver of an imaging sensor which includes a plurality of pixels each including a photoelectric converter and a charge holder which holds charges transferred from the photoelectric converter and from which a signal corresponding to the charges is read out by a reading circuit, and an imaging surface on which a plurality of pixel rows each including a plurality of pixels arranged in a first direction are arranged in a second direction orthogonal to the first direction to consecutively perform driving of starting exposure of the plurality of pixels by resetting the photoelectric converter of each of the plurality of pixels at the same time, ending the exposure by transferring the charges accumulated in the photoelectric converter of each of the plurality of pixels by the exposure to the charge holder at the same time, and then, sequentially selecting the pixel row from one end side to another end side of the imaging surface in the second direction, and reading out a pixel signal corresponding to the charges held in the charge holder of the selected pixel row;
perform a process of dividing captured image data generated based on the pixel signal read out by the driving into a plurality of areas in the second direction and detecting a moving object from the area based on a result of comparing the generated area with the same area as the area in the captured image data generated based on the pixel signal read out by the driving performed before the driving; and
predict a timing at which a range set in the captured image data overlaps with the moving object based on a change in position of the moving object detected by the processor and processes the pixel signal read out by the driving executed in a period including the timing as a signal for recording on a recording medium, and
wherein a timing at which generation of an area that is generated based on the pixel signal read out from the pixel row on the other end side of the imaging surface from the pixel row from which the pixel signal of a generation source of a first area including the range in the captured image data generated based on the pixel signal read out by the driving is completed is present in a period in which the driving is performed after the driving is performed twice, and
the plurality of areas include the first area, a second area, and a third area, wherein at least three of the second areas that are generated based on the pixel signal read out from the pixel row on the one end side of the imaging surface from the pixel row from which the pixel signal of the generation source of the first area is read out, and at least four of the third areas that are generated based on the pixel signal read out from the pixel row on the other end side of the imaging surface from the pixel row from which the pixel signal of the generation source of the first area is read out.

2. The imaging control device according to claim 1, wherein the number of the second areas is different from the number of the third areas.

3. The imaging control device according to claim 1, wherein a timing at which generation of the captured image data generated based on the pixel signal read out by the driving is completed is present in a period in which the driving subsequent to the driving is performed.

4. The imaging control device according to claim 1, wherein the number of the second areas is the same as the number of the third areas.

5. The imaging control device according to claim 3, wherein the number of the second areas is the same as the number of the third areas.

6. The imaging control device according to claim 1, wherein a width of the second areas in the second direction is different from a width of the third areas in the second direction.

7. The imaging control device according to claim 1, wherein the processor controls a total number of the second areas and the third areas based on a focal length of an imaging optical system arranged in front of the imaging sensor.

8. The imaging control device according to claim 7, wherein in a case where the focal length is less than or equal to a threshold value, the processor increases the total number from the total number in a case where the focal length exceeds the threshold value.

9. The imaging control device according to claim 1, the processor further configured to:
in a case where the moving object is detected by the processor and the timing is predicted based on the moving object, predict a distance to the moving object in a period based on a difference between a time at which the moving object is detected and a start time of the driving executed in the period including the predicted timing, and a change of a distance from the imaging surface to the moving object detected by the processor, and control a focal position of an imaging optical system arranged in front of the imaging sensor in the period based on the predicted distance.

10. An imaging apparatus comprising:
the imaging control device according to claim 1;
the imaging sensor; and
the driver.

11. An imaging control method comprising:
a drive control step of controlling a driver of an imaging sensor which includes a plurality of pixels each including a photoelectric converter and a charge holder which holds charges transferred from the photoelectric converter and from which a signal corresponding to the charges is read out by a reading circuit, and an imaging surface on which a plurality of pixel rows each including a plurality of the pixels arranged in a first direction are arranged in a second direction orthogonal to the first direction to consecutively perform driving of starting exposure of the plurality of pixels by resetting the photoelectric converter of each of the plurality of pixels at the same time, ending the exposure by transferring the charges accumulated in the photoelectric converter of each of the plurality of pixels by the exposure to the charge holder at the same time, and then, sequentially selecting the pixel row from one end side to another end side of the imaging surface in the second direction, and reading out a pixel signal corresponding to the charges held in the charge holder of the selected pixel row;
a moving object detection step of performing a process of dividing captured image data generated based on the pixel signal read out by the driving into a plurality of areas in the second direction and detecting a moving object from the area based on a result of comparing the generated area with the same area as the area in the captured image data generated based on the pixel signal read out by the driving performed before the driving; and
a recording control step of predicting a timing at which a range set in the captured image data overlaps with the moving object based on a change in position of the moving object detected in the moving object detection step and processing the pixel signal read out by the driving executed in a period including the timing as a signal for recording on a recording medium, and
wherein a timing at which generation of an area that is generated based on the pixel signal read out from the pixel row on the other end side of the imaging surface from the pixel row from which the pixel signal of a generation source of a first area including the range in the captured image data generated based on the pixel signal read out by the driving is completed is present in a period in which the driving is performed after the driving is performed twice, and
the plurality of areas include the first area, a second area, and a third area, wherein at least three of the second areas that are generated based on the pixel signal read out from the pixel row on the one end side of the imaging surface from the pixel row from which the pixel signal of the generation source of the first area is read out, and at least four of the third areas that are generated based on the pixel signal read out from the pixel row on the other end side of the imaging surface from the pixel row from which the pixel signal of the generation source of the first area is read out.

12. The imaging control method according to claim 11, wherein the number of the second areas is different from the number of the third areas.

13. The imaging control method according to claim 11, wherein a timing at which generation of the captured image data generated based on the pixel signal read out by the driving is completed is present in a period in which the driving subsequent to the driving is performed.

14. The imaging control method according to claim 11, wherein the number of the second areas is the same as the number of the third areas.

15. The imaging control method according to claim 13, wherein the number of the second areas is the same as the number of the third areas.

16. The imaging control method according to claim 11, wherein a width of the second areas in the second direction is different from a width of the third areas in the second direction.

17. The imaging control method according to claim 11, wherein in the moving object detection step, a total number of the second areas and the third areas is controlled based on a focal length of an imaging optical system arranged in front of the imaging sensor.

18. The imaging control method according to claim 17, wherein in a case where the focal length is less than or equal to a threshold value, in the moving object detection step, the total number is increased from the total number in a case where the focal length exceeds the threshold value.

19. The imaging control method according to claim 11, further comprising:
a focus control step of, in a case where the moving object is detected in the moving object detection step and the timing is predicted based on the moving object, predicting a distance to the moving object in a period based on a difference between a time at which the moving object is detected and a start time of the driving executed in the period including the predicted timing, and a change of a distance from the imaging surface to the moving object detected in the moving object detection step, and controlling a focal position of an imaging optical system arranged in front of the imaging sensor in the period based on the predicted distance.

20. A non-transitory computer readable recording medium storing an imaging control program causing a computer to execute:
  a drive control step of controlling a driver of an imaging sensor which includes a plurality of pixels each including a photoelectric converter and a charge holder which holds charges transferred from the photoelectric converter and from which a signal corresponding to the charges is read out by a reading circuit, and an imaging surface on which a plurality of pixel rows each including a plurality of the pixels arranged in a first direction are arranged in a second direction orthogonal to the first direction to consecutively perform driving of starting exposure of the plurality of pixels by resetting the photoelectric converter of each of the plurality of pixels at the same time, ending the exposure by transferring the charges accumulated in the photoelectric converter of each of the plurality of pixels by the exposure to the charge holder at the same time, and then, sequentially selecting the pixel row from one end side to another end side of the imaging surface in the second direction, and reading out a pixel signal corresponding to the charges held in the charge holder of the selected pixel row;
  a moving object detection step of performing a process of dividing captured image data generated based on the pixel signal read out by the driving into a plurality of areas in the second direction and detecting a moving object from the area based on a result of comparing the generated area with the same area as the area in the captured image data generated based on the pixel signal read out by the driving performed before the driving; and
  a recording control step of predicting a timing at which a range set in the captured image data overlaps with the moving object based on a change in position of the moving object detected in the moving object detection step and processing the pixel signal read out by the driving executed in a period including the timing as a signal for recording on a recording medium, and
wherein a timing at which generation of an area that is generated based on the pixel signal read out from the pixel row on the other end side of the imaging surface from the pixel row from which the pixel signal of a generation source of a first area including the range in the captured image data generated based on the pixel signal read out by the driving is completed is present in a period in which the driving is performed after the driving is performed twice, and
the plurality of areas include the first area, a second area, and a third area, wherein at least three of the second areas that are generated based on the pixel signal read out from the pixel row on the one end side of the imaging surface from the pixel row from which the pixel signal of the generation source of the first area is read out, and at least four of the third areas that are generated based on the pixel signal read out from the pixel row on the other end side of the imaging surface from the pixel row from which the pixel signal of the generation source of the first area is read out.

\* \* \* \* \*